United States Patent
Westrick, Jr. et al.

(10) Patent No.: US 11,070,616 B2
(45) Date of Patent: Jul. 20, 2021

(54) NETWORK PROTOCOLS TO MINIMIZE REPEATS IN A FLOOD NETWORK

(71) Applicant: ABL IP HOLDING LLC, Conyers, GA (US)

(72) Inventors: Richard L. Westrick, Jr., Social Circle, GA (US); Alan David Sanders, Atlanta, GA (US)

(73) Assignee: ABL IP HOLDING LLC, Conyers, GA (US)

( * ) Notice: Subject to any disclaimer, the term of this patent is extended or adjusted under 35 U.S.C. 154(b) by 11 days.

(21) Appl. No.: 16/662,691

(22) Filed: Oct. 24, 2019

(65) Prior Publication Data
US 2021/0126968 A1 Apr. 29, 2021

(51) Int. Cl.
*H04L 29/08* (2006.01)
*H04W 84/20* (2009.01)

(52) U.S. Cl.
CPC ...... *H04L 67/1093* (2013.01); *H04L 67/1068* (2013.01); *H04W 84/20* (2013.01)

(58) Field of Classification Search
CPC .................. H04L 67/1093; H04L 67/1068
See application file for complete search history.

(56) References Cited

U.S. PATENT DOCUMENTS 5,974,236 A * 10/1999 Sherman ................. G06F 13/38
9,531,632 B2    12/2016 Hellhake et al.

OTHER PUBLICATIONS

Amir Qayyum et al., "Multipoint relaying for flooding broadcast messages in mobile wireless networks," 35th Annual Hawaii International Conference on System Sciences (HICSS'2002), Jan. 2002, Maui, United States, pp. 3386-3875.
Notice of Allowance for U.S. Appl. No. 16/811,072, dated May 12, 2021, 10 pages.

* cited by examiner

*Primary Examiner* — Ronald B Abelson
(74) *Attorney, Agent, or Firm* — RatnerPrestia

(57) ABSTRACT

A method includes based on neighbor relationships among radio frequency (RF) nodes of a flooding wireless network, designating some but not all of the RF nodes as repeaters. The designating step selects (RF) nodes as repeaters such that each RF node of the flooding wireless network has at least two neighboring RF nodes designated as repeaters. The method further includes configuring designated RF nodes to act as repeaters to receive and resend network packet transmissions from other RF nodes through the flooding wireless network. The method further includes configuring all RF nodes not designated as repeaters not to resend network packet transmissions from other RF nodes through the flooding wireless network.

18 Claims, 24 Drawing Sheets

General Repeater
Designation
Protocol 300

*FIG. 3*

Based on neighbor relationships among radio frequency (RF) nodes of a flooding wireless network, designating some but not all of the RF nodes as repeaters, wherein the designating selects (RF) nodes as repeaters such that each RF node of the flooding wireless network has at least two neighboring RF nodes designated as repeaters 305

↓

Configuring designated RF nodes to act as repeaters to receive and resend packet transmissions from other RF nodes through the flooding wireless network 310

↓

Configuring all RF nodes not designated as repeaters not to receive and resend packet transmissions from other RF nodes through the flooding wireless network 320

*FIG. 5*

RF Node Neighbor Relationship Matrix 500

RF Node Identifier 510x

Neighbor Relationship Status 515A UNSET

Neighbor Relationship Status 515I SET

Neighbor Relationship Status 515L UNSET

←—X—→

| | 1 | 2 | 3 | 4 | 5 | 6 | 7 | 8 | 9 | 10 | 11 | 12 |
|---|---|---|---|---|---|---|---|---|---|---|---|---|
| 1 | 0 | 0 | 0 | 1 | 0 | 0 | 0 | 0 | 1 | 0 | 0 | 0 |
| 2 | 0 | 0 | 1 | 1 | 1 | 0 | 0 | 0 | 0 | 0 | 1 | 0 |
| 3 | 0 | 1 | 0 | 1 | 1 | 0 | 0 | 1 | 1 | 1 | 1 | 1 |
| 4 | 1 | 1 | 1 | 0 | 0 | 0 | 0 | 0 | 1 | 1 | 0 | 1 |
| 5 | 0 | 1 | 1 | 0 | 0 | 0 | 0 | 1 | 1 | 1 | 1 | 0 |
| 6 | 0 | 0 | 0 | 0 | 0 | 0 | 1 | 1 | 1 | 1 | 0 | 1 |
| 7 | 0 | 0 | 0 | 0 | 0 | 1 | 0 | 1 | 0 | 0 | 0 | 0 |
| 8 | 0 | 0 | 1 | 0 | 1 | 1 | 1 | 0 | 1 | 1 | 1 | 1 |
| 9 | 1 | 0 | 1 | 1 | 1 | 1 | 0 | 1 | 0 | 1 | 0 | 1 |
| 10 | 0 | 0 | 1 | 1 | 1 | 1 | 0 | 1 | 1 | 0 | 0 | 1 |
| 11 | 0 | 1 | 1 | 0 | 1 | 0 | 0 | 1 | 0 | 0 | 0 | 0 |
| 12 | 0 | 0 | 1 | 1 | 0 | 1 | 0 | 1 | 1 | 1 | 0 | 0 |

↑—Y—↓

Shows which RF nodes can communicate with each other

Neighbor Relationship Status 526E UNSET

Neighbor Relationship Status 524I SET

Neighbor Relationship Status 523J SET

FIG. 7

RF Node Neighbor Relationship Matrix 500

| | 1 | 2 | 3 | 4 | 5 | 6 | 7 | 8 | 9 | 10 | 11 | 12 | |
|---|---|---|---|---|---|---|---|---|---|---|---|---|---|
| 1 | 0 | 0 | 0 | ①| 0 | 0 | 0 | 0 | ①| 0 | 0 | 0 | ② |
| 2 | 0 | 0 | 1 | 1 | 1 | 0 | 0 | 0 | 0 | 0 | 1 | 0 | 4 |
| 3 | 0 | 1 | 0 | 1 | 1 | 0 | 0 | 1 | 1 | 1 | 1 | 1 | 8 |
| 4 | 1 | 1 | 1 | 0 | 0 | 0 | 0 | 0 | 1 | 1 | 0 | 1 | 6 |
| 5 | 0 | 1 | 1 | 0 | 0 | 0 | 0 | 1 | 1 | 1 | 1 | 0 | 6 |
| 6 | 0 | 0 | 0 | 0 | 0 | 0 | 1 | 1 | 1 | 1 | 0 | 1 | 5 |
| 7 | 0 | 0 | 0 | 0 | 0 | ①| 0 | ①| 0 | 0 | 0 | 0 | ② |
| 8 | 0 | 0 | 1 | 0 | 1 | 1 | 1 | 0 | 1 | 1 | 1 | 1 | 8 |
| 9 | 1 | 0 | 1 | 1 | 1 | 1 | 0 | 1 | 0 | 1 | 0 | 1 | 8 |
| 10 | 0 | 0 | 1 | 1 | 1 | 1 | 0 | 1 | 1 | 0 | 0 | 1 | 7 |
| 11 | 0 | 1 | 1 | 0 | 1 | 0 | 0 | 1 | 0 | 0 | 0 | 0 | 4 |
| 12 | 0 | 0 | 1 | 1 | 0 | 1 | 0 | 1 | 1 | 1 | 0 | 0 | 6 |

RF Node Identifier 510x
Neighbor Relationship Status 515D SET
Neighbor Relationship Status 515I SET
Number of Neighbors 605G
Number of Neighbors 605A
Neighbor Relationship Status 521G SET
Neighbor Relationship Status 521H SET
Number of Neighbors 605L

*FIG. 8*

RF Node Neighbor Relationship Matrix 500

|    | 1 | 2 | 3 | 4 | 5 | 6 | 7 | 8 | 9 | 10 | 11 | 12 |
|----|---|---|---|---|---|---|---|---|---|----|----|----|
| 1  | 0 | 0 | 0 | 1 | 0 | 0 | 0 | 1 | 0 | 0  | 0  | 0  |
| 2  | 0 | 0 | 1 | 1 | 1 | 0 | 0 | 0 | 0 | 1  | 0  | 0  |
| 3  | 0 | 1 | 0 | 1 | 1 | 0 | 0 | 1 | 1 | 1  | 0  | 1  |
| 4  | 1 | 1 | 1 | 0 | 0 | 0 | 0 | 1 | 1 | 0  | 1  | 1  |
| 5  | 0 | 1 | 1 | 0 | 0 | 0 | 1 | 1 | 0 | 1  | 0  | 0  |
| 6  | 0 | 0 | 0 | 0 | 0 | 0 | 1 | 1 | 1 | 0  | 1  | 1  |
| 7  | 0 | 0 | 0 | 0 | 1 | 1 | 0 | 0 | 0 | 0  | 0  | 0  |
| 8  | 1 | 0 | 1 | 1 | 1 | 1 | 0 | 0 | 1 | 0  | 1  | 0  |
| 9  | 0 | 0 | 1 | 1 | 0 | 1 | 0 | 1 | 0 | 0  | 0  | 1  |
| 10 | 0 | 1 | 1 | 0 | 1 | 0 | 0 | 0 | 1 | 0  | 0  | 1  |
| 11 | 0 | 0 | 0 | 1 | 0 | 1 | 0 | 1 | 0 | 0  | 0  | 0  |
| 12 | 0 | 0 | 1 | 1 | 0 | 1 | 0 | 0 | 1 | 1  | 0  | 0  |

RF Node Identifier 510x

Number of Repeaters 805A-L (using RF Nodes 4, 6, 8, 9 as repeaters): 2, 1, 3, 1, 2, 2, 2, 2, 3, 4, 1, 4

Marks: ✓ ✗ ✓ ✗ ✓ ✓ ✓ ✓ ✓ ✓ ✗ ✓

*FIG. 9*

RF Node Repeater Matrix 900

RF Node Identifier 510x

Neighbor Relationship Status 515A

|    | 1 | 2 | 3 | 4 | 5 | 6 | 7 | 8 | 9 | 10 | 11 | 12 |
|----|---|---|---|---|---|---|---|---|---|----|----|----|
| 1  |   |   |   |   |   |   |   |   |   |    |    |    |
| 2  | 0 | 0 | 1 |   | 1 |   | 0 |   |   | 0  | 1  | 0  |
| 3  |   |   |   |   |   |   |   |   |   |    |    |    |
| 4  | 1 | 1 | 1 |   | 0 |   | 0 |   |   | 1  | 0  | 1  |
| 5  |   |   |   |   |   |   |   |   |   |    |    |    |
| 6  |   |   |   |   |   |   |   |   |   |    |    |    |
| 7  |   |   |   |   |   |   |   |   |   |    |    |    |
| 8  |   |   |   |   |   |   |   |   |   |    |    |    |
| 9  |   |   |   |   |   |   |   |   |   |    |    |    |
| 10 |   |   |   |   |   |   |   |   |   |    |    |    |
| 11 | 0 | 1 | 1 |   | 1 |   | 0 |   |   | 0  | 0  | 0  |
| 12 |   |   |   |   |   |   |   |   |   |    |    |    |
|    | ① | 2 | ③ | 0 | 2 | 0 | 0 | 0 | 0 | 1  | 1  | ① |

The whited out numbers are either for RF nodes that have at least two repeaters (along the left column) or for nodes that are already assigned to be repeaters (along top row).

Neighbor Relationship Status 526A

Number of Connections 925A = Potential Repeater Score 930A

Number of Connections Score 925C = Potential Repeater Score 930C

Number of Connections 925L = Potential Repeater Score 930L

*FIG. 10*

RF Node Repeater Matrix 900

| | 1 | 2 | 3 | 4 | 5 | 6 | 7 | 8 | 9 | 10 | 11 | 12 |
|---|---|---|---|---|---|---|---|---|---|---|---|---|
| 1 | | | | | | | | | | | | |
| 2 | .00 | .00 | .33 | | .33 | | .00 | | | .00 | .33 | .00 |
| 3 | | | | | | | | | | | | |
| 4 | .20 | .20 | .20 | | .00 | | .00 | | | .20 | .00 | .20 |
| 5 | | | | | | | | | | | | |
| 6 | | | | | | | | | | | | |
| 7 | | | | | | | | | | | | |
| 8 | | | | | | | | | | | | |
| 9 | | | | | | | | | | | | |
| 10 | | | | | | | | | | | | |
| 11 | .00 | .33 | .33 | | .33 | | .00 | | | .00 | .00 | .00 |
| 12 | | | | | | | | | | | | |
| | .20 | .53 | .87 | .00 | .67 | .00 | .00 | .00 | .00 | .20 | .33 | .20 |

Center of matrix: $\dfrac{1}{\text{NumConnections}_X}$

- RF Node Identifier 510x
- Potential Repeater Sub-Score 1015A
- Potential Repeater Sub-Score 1015K
- Potential Repeater Sub-Score 1025L
- Potential Repeater Score 930A (.20)
- Highest Potential Repeater Score 930C (.87)
- Potential Repeater Score 930L (.20)

*FIG.13*

|  | con needed | RF Node Repeater Matrix 900 / Number of Connections Needed 1210A-L | | | | | | | | | | | |
|---|---|---|---|---|---|---|---|---|---|---|---|---|---|
| RF Node Identifier 510x | | 1 | 2 | 3 | 4 | 5 | 6 | 7 | 8 | 9 | 10 | 11 | 12 |
| 1 | 0 | 0.0 | 0.0 | 3.3 | | | | | | | 0.0 | 3.3 | 0.0 |
| 2 | 2 | | 2.0 | 2.0 | | 3.3 | 0.0 | | | | 2.0 | 0.0 | 2.0 |
| 3 | 0 | 2.0 | | | | | 0.0 | 0.0 | | | | | |
| 4 | 2 | | | | | | | | | | | | |
| 5 | 0 | | | | | | | | | | | | |
| 6 | 0 | | | | | | | | | | | | |
| 7 | 0 | | | | | | | | | | | | |
| 8 | 0 | | | | | | | | | | | | |
| 9 | 0 | | | | | | | | | | | | |
| 10 | 0 | | | | | | | | | | | | |
| 11 | 1 | 0.0 | 1.7 | 1.7 | | 1.7 | | | | | 0.0 | 0.0 | |
| 12 | 0 | | | | | | | | | | | | |
| 7.00 | | 2.0 | 3.7 | 7.0 | .0 | 5.0 | .0 | .0 | .0 | .0 | 2.0 | 3.3 | 2.0 |

Centralized Repeater Designation Protocol 1400
(e.g., implemented in centralized repeater
designation programming 2090 of FIGS. 20-23)

FIG. 14

| Transmitting, from each respective RF node to other RF nodes, a neighbor relationship status message 1405 |

↓

| In response to receiving a reply message to the neighbor relationship status message at each respective RF node from a respective first subset of other RF nodes within a predetermined timeout period: establishing that each of the respective first subset of other RF nodes are within range to directly transmit and receive network packets to and from the respective RF node over the flooding wireless network 1410 |

↓

| In response to failing to receive the reply message to the neighbor relationship status message from a respective second subset of the other RF nodes within the predetermined timeout period: establishing that the respective second subset of other RF nodes are not within range to directly transmit and receive network packets to and from the respective RF node over the flooding wireless network 1420 |

↓

| Based on the respective RF node neighbor list, for each respective RF node, determining a respective number of neighbors 1430 |

↓

| In response to determining that the respective number of neighbors is set to one or two for the respective RF node, transmitting a repeater designation message to each respective RF node identifier in the respective RF node neighbor list to designate the respective first subset of other RF nodes as repeaters 1440 |

↓

| Assigning at least two designated repeaters of network packets over the flooding wireless network for each respective RF node having two or more neighbor RF nodes 1450 |

NETWORK PROTOCOLS TO MINIMIZE REPEATS IN A FLOOD NETWORK

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, the luminance output can be turned ON/OFF and often can be adjusted up or dimmed down. In some devices, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

Conventional wall switches and light fixtures communicate over wired systems. More recent lighting systems are wireless, which allow communication over a radio frequency (RF) network; however, it is difficult to control these systems as the systems scale in size. Some wireless lighting communication control systems communicate over a routing mesh. In a routing mesh, network packets are addressed through the network one node to the next, as in A(B(D(F (E)))). If the network packet does not get through the network, the dropped network packet can be detected and a new route tried. One goal of a routing algorithm is to minimize hops, while maintain reliability.

Some routing meshes use a flood network. In an uncontrolled flood network, every incoming network packet sent from a source RF node is sent to all other RF nodes except the source RF node. Unless conditional logic is used, broadcast storms can occur. In a controlled flood network, RF nodes receive every network packet for a group and decide whether to repeat the network packet. In the controlled flood network, algorithms are used to ensure reliable delivery and head off broadcast storms, for example, based on sequence number controlled flooding (SNCF) and reverse path forwarding (RPF).

In SNCF, the RF node attaches its own address and sequence number to the network packet. If the RF node receives a network packet in memory, it drops the network packet immediately while in RPF, the RF node will only send the network packet forward. If the network packet is received from the next RF node, it sends it back to the sender. While SNCF and RPF result in every message eventually being delivered to all reachable parts of the network, algorithms may need to be more complex. In some cases, precautions have to be taken to avoid wasted duplicate deliveries and infinite loops, and to allow network packets to eventually expire from the system.

Accordingly, a system is needed to overcome these and other limitations in the art, including minimizing network packet retransmissions while maintaining reliability of the wireless lighting system.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a flow chart of a general repeater designation protocol to efficiently designate repeaters over the flooding wireless network, specifically designating at least N repeaters.

FIG. 5 is the RF node neighbor relationship matrix built in the first block of the matrix repeater designation protocol.

FIG. 7 shows the RF node neighbor relationship matrix alongside a count of number of neighbors for each of the RF nodes.

FIG. 8 shows how the number of neighbors affects the designation of repeaters to satisfy the constraint of the matrix repeater designation protocol that each of RF nodes has at least two repeater neighbors.

FIG. 9 shows the determination of a number of connections for RF nodes and a first example calculation of potential repeater scores of the matrix repeater designation protocol.

FIG. 10 depicts a second example calculation of potential repeater scores of the matrix repeater designation protocol.

FIG. 13 depicts a fifth calculation of repeater scores of the matrix repeater designation protocol.

FIG. 14 is a flow chart of a method of the decentralized repeater designation protocol for designating some but not all of the RF nodes of the flooding wireless network as repeaters.

DETAILED DESCRIPTION

Figure 1:
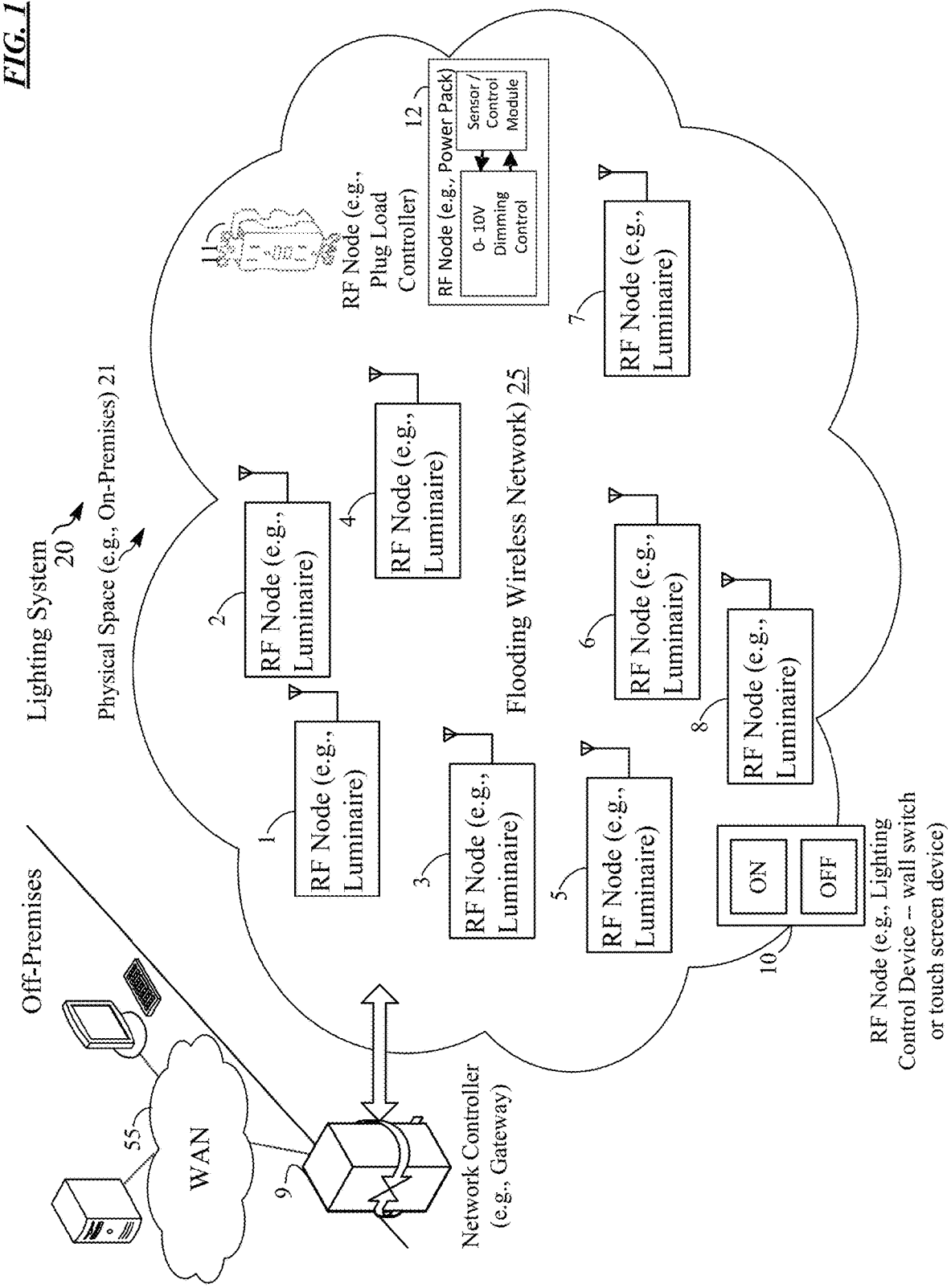
FIG. 1 illustrates a functional block diagram of an example of a wireless lighting system that includes a flooding wireless network of RF nodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

FIG. 1 illustrates a functional block diagram of an example of a wireless lighting system 20 that includes a flooding wireless network 25 of radio frequency (RF) nodes. The flooding wireless network 25 supports light commissioning/control/maintenance to provide a variety of lighting control, including communications in support of turning lights on/off, dimming, set scene, and sensor trip events. The twelve RF nodes include eight luminaires 1-8, a gateway (e.g., network controller) 9, lighting control device 10 (e.g., wall switch or touch screen device), a plug load controller 11, and a power pack 12. RF nodes 1-12 can execute repeater designation programming (elements 1990, 2090 of FIGS. 19-23) to designate RF repeater nodes of the flooding wireless network 25 and a lighting control application (element 2039 of FIGS. 20-23) for communication over the flooding wireless network 25. RF nodes 1-12 are installed in a physical space (e.g., on-premises) 21, which can be in indoor or outdoor installation area.

Each RF node, such as luminaires 1-8, gateway 9, lighting control device 10, plug load controller 11, and power pack 12 can be equipped with a wireless network transceiver. For example, the wireless network transceiver can include a near range Bluetooth Low Energy (BLE) radio that communicates over the flooding wireless network 25 for purposes of commissioning, maintenance, and control operation of the wireless lighting system 20.

Plug load controller 11 plugs into existing AC wall outlets, for example, and allows existing wired lighting devices, such as table lamps or floor lamps that plug into a wall outlet, to operate in the lighting control system 1. Plug load controller 11 instantiates a wired lighting device, such as a table lamp or floor lamp, by allowing for commissioning and maintenance operations and processes wireless lighting controls in order to the allow the wired lighting device to operate in the lighting system 20.

Power pack 12 retrofits with existing wired light fixtures (luminaires). Power pack 12 instantiates the wired light fixture by allowing for commissioning and maintenance operations and processes wireless lighting controls in order to allow a wired lighting device to operate in the lighting system 20.

The specific hardware, software, and firmware of luminaires 1-8, gateway 9, lighting control device 10, plug load controller 11, and power pack 12 are depicted and described in detail in FIGS. 19-23. It should be understood that in the example herein, the luminaires 1-8, gateway 9, lighting control device 10, plug load controller 11, and power pack 12 are just one example of an RF node, which includes additional components. Hence, the matrix repeater designation programming 1990 of FIG. 19 and decentralized repeater designation programming 2090 of FIGS. 20-23 described herein can be applied to various other types of RF nodes.

Figure 19:
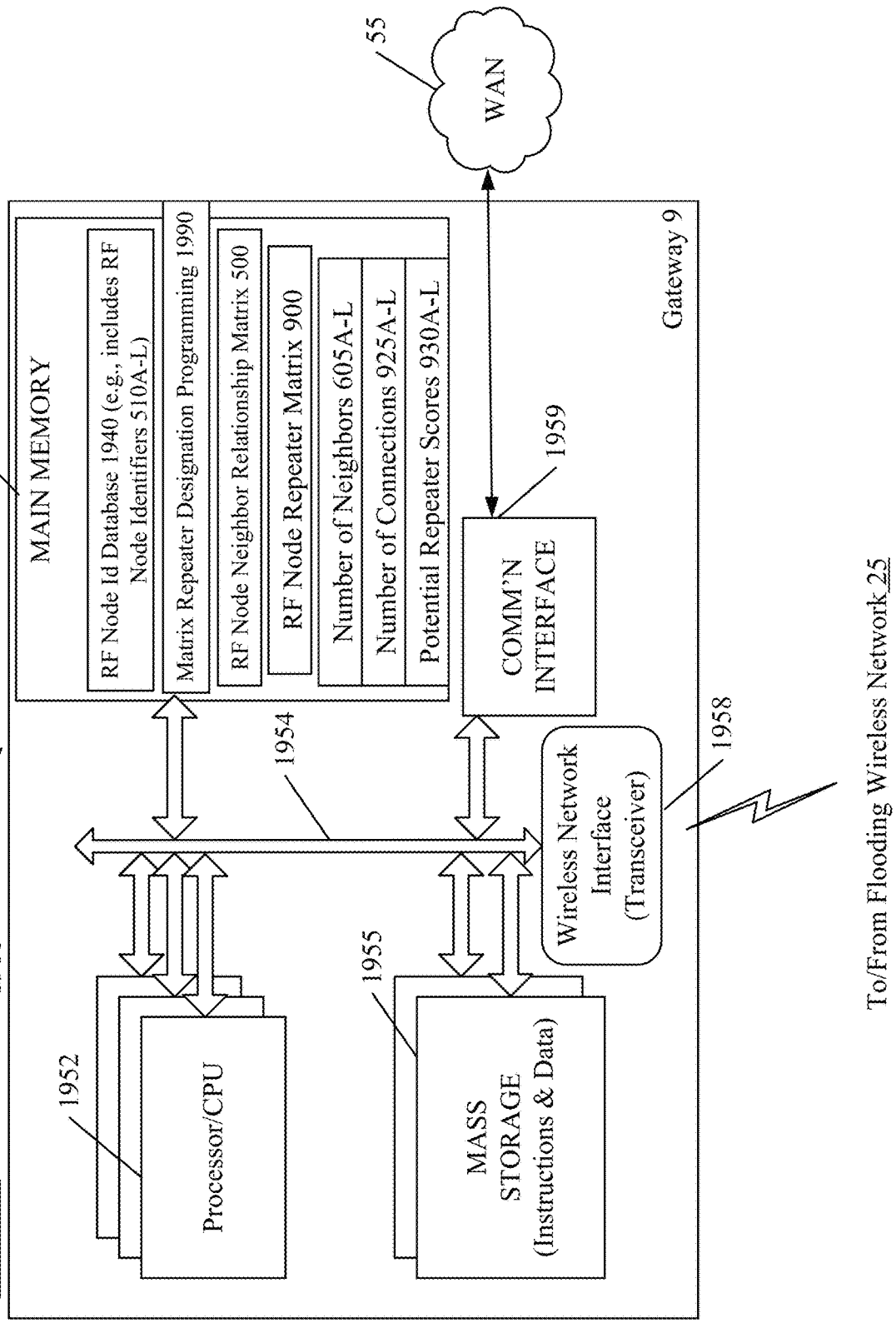
FIG. 19 is a functional block diagram of the gateway RF node, by way of just one example of a computing device platform that may perform the functions of the network controller.
Figure 20:
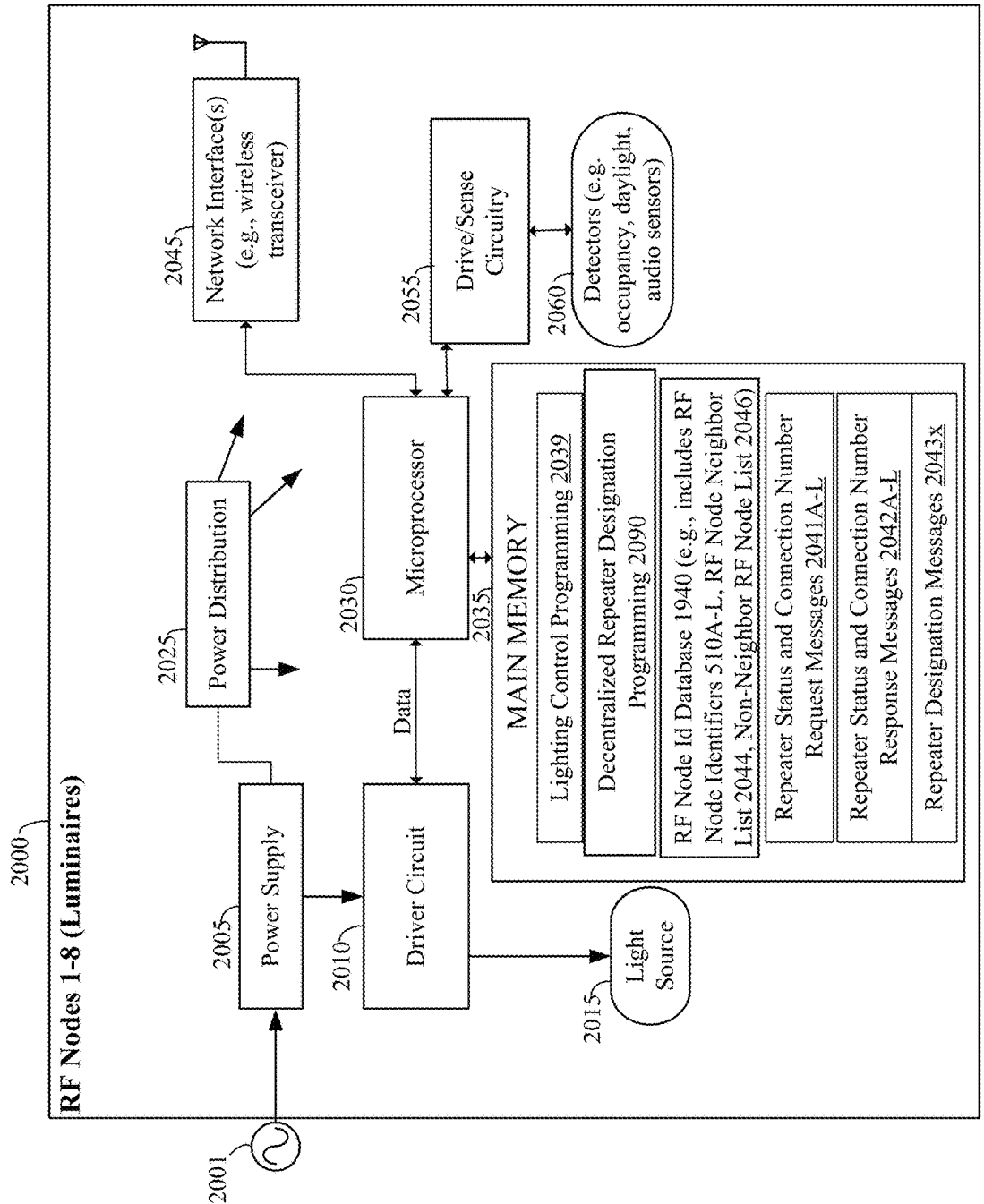
FIG. 20 is a block diagram of a luminaire configured as RF nodes that communicate via the flooding wireless network in the lighting system of FIG. 1.

Generally, an RF node includes a minimum subset of components of the luminaire 2000 shown in FIG. 20, such as the wireless transceiver 2045, memory 2035 (including the decentralized repeater designation programming 2090), microprocessor 2030, and power supply 2005. However, the RF node does not have to include the light source 2015, driver circuit 2010, drive/sense circuitry 2055, and detector (s) 2060 components. An RF node can also implement the network controller 1900 of FIG. 19 and thus may include components like that shown in FIG. 19 for the gateway 9, such as memory 1935 (including matrix repeater designation programming 1990). A wireless beacon is an example of an RF node that is a chip with a radio that emits a signal with a certain signal strength, small packets of information, and has an RF positioning node identifier. RF nodes can be connected together via the flooding wireless network 25.

Figure 2A:
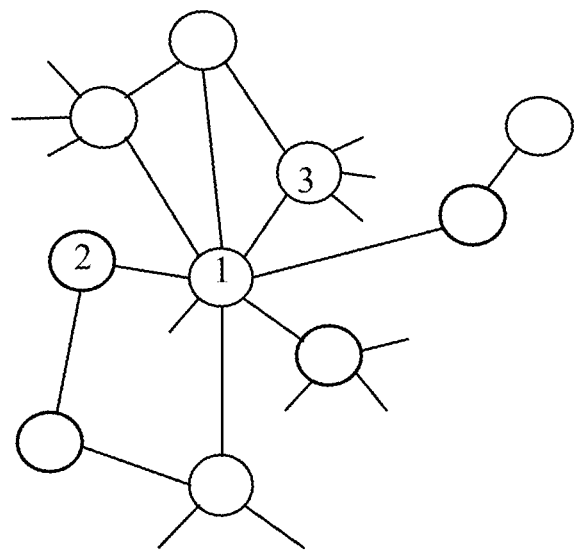
FIGS. 2A-B are schematics depicting the concept of designating at least N repeaters over the flooding wireless network of a repeater designation protocol.
Figure 2B:
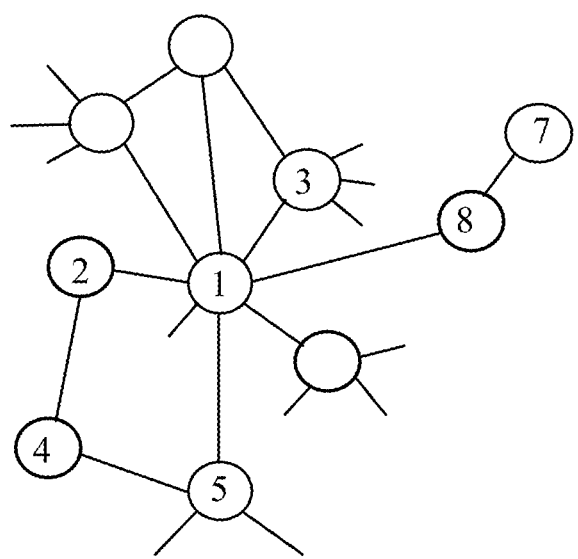

FIGS. 2A-B are schematics depicting the concept of designating at least N repeaters over the flooding wireless network 25 of a repeater designation protocol 300 described in FIG. 3. As shown in FIG. 2A, RF node 1 has two neighbor RF nodes 2-3 that are repeaters. As shown in FIG. 2B, RF node 4 has only two neighbor RF nodes 2, 5, so RF nodes 2 and 5 both must be repeaters. RF node 7 has only one neighbor RF node 8, so RF node 8 must be a repeater. The only way to satisfy the goal of at least two neighbors (N≥2) designated as repeaters, would be for the repeater designation protocol 300 to add an RF node that has a connection to RF node 7.

Figure 4:
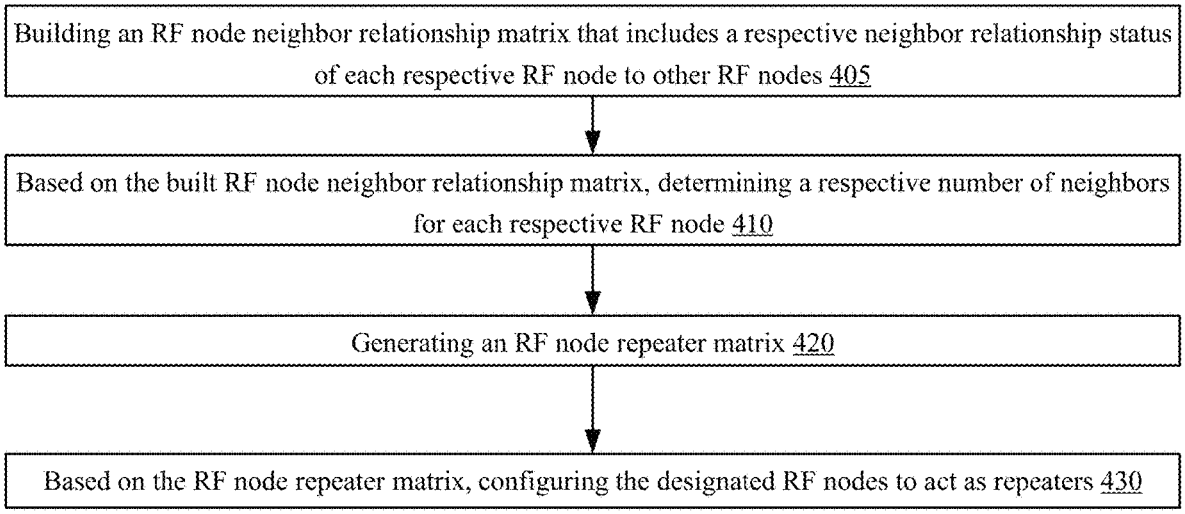
FIG. 4 is a flow chart of a matrix repeater designation protocol for designating some but not all of the RF nodes of the flooding wireless network as repeaters.

FIG. 3 is a flow chart of a general repeater designation protocol 300 to efficiently designate repeaters over the flooding wireless network 25, specifically designating at least N repeaters. This general repeater designation protocol covers both the matrix repeater designation programming 1990 of FIGS. 4 and 19 and the decentralized repeater designation programming of FIGS. 14 and 20-23, which can be implemented in one RF node or multiple RF nodes, respectively. The matrix repeater designation programming 1990 of FIGS. 4 and 19 is centralized and is implemented in only one of the RF nodes 1-12, for example, the gateway 9. On the other hand, the decentralized repeater designation programming 2090 is implemented in each of the luminaires 1-8, gateway 9, lighting control device 10, plug load controller 11, and power pack 12.

Beginning in block 305, the general repeater designation protocol 300 includes based on neighbor relationships among RF nodes 1-12 of a flooding wireless network 25, designating some but not all of the RF nodes 1-12 as repeaters. The designating includes selecting (RF) nodes as repeaters such that each RF node 1-12 of the flooding wireless network 25 has at least two neighboring RF nodes designated as repeaters.

Continuing to block 310, the general repeater designation protocol 300 includes configuring designated RF nodes to act as repeaters to receive and resend network packet transmissions from other RF nodes through the flooding wireless network 25. Finishing in block 320, the general repeater designation protocol 300 includes configuring all RF nodes not designated as repeaters not resend network packet transmissions from other RF nodes through the flooding wireless network 25.

As noted, two specific types of repeater designation algorithms (matrix and decentralized) can be utilized for designating some but not all of the RF nodes as repeaters in block 305 of the general repeater designation protocol. The repeater designation algorithms efficiently designate repeaters over the flooding wireless network 25. In particular, the two types of repeater designation algorithms guarantee at least two neighbors of every RF node are repeaters, for every RF node that has two or more neighbor RF nodes.

Each of the two repeater designation algorithms are implemented in programming to achieve the goal of minimizing the number of repeaters, which minimizes the number of times network packets are repeated, while guaranteeing that each RF node has at least N number of neighbor connections that are repeaters. The first type of repeater designation algorithm is implemented in matrix repeater designation programming 1990 that is implemented as a centralized network protocol, for example, in the gateway (e.g., network controller) and is described in FIGS. 4-13 and 19. The second type of repeater designation algorithm is implemented in decentralized repeater designation programming 2090, for example, in each of the RF nodes 1-12, and is described in FIGS. 14-17 and 19-23. A scatter plot comparing the results of the matrix repeater designation programming 1990 and the decentralized repeater designation programming 2090 is then shown in FIG. 19.

FIG. 4 is a flow chart of a matrix repeater designation protocol 400 (e.g., implemented in matrix repeater designation programming of FIG. 19) for designating some but not all of the RF nodes 1-12 of the flooding wireless network 25 as repeaters. The matrix repeater designation protocol 400 is implemented as sub-blocks of block 305 of the general repeater designation protocol 300 FIG. 3. This matrix repeater designation protocol 400 is implemented as a centralized network protocol, for example, in the gateway 9 (e.g., network controller 1900 of FIG. 19) or any one of the other RF nodes 1-8 and 10-12.

Beginning in block 405, the matrix repeater designation protocol 400 includes building an RF node neighbor relationship matrix 500 that includes a respective neighbor relationship status 515A-L, 516A-L, 526A-L of each respective RF node (e.g., 1) to other RF nodes (e.g., 2-12). As shown in FIG. 5, the RF node neighbor relationship matrix 500 can be a two-dimensional array (shown in human readable table form) of rows and columns that forms a matrix of connections between all RF nodes 1-12. For each respective RF node (e.g., 4, 9) the respective neighbor relationship status (e.g., 515D, 515I) is set to indicate each of one or more neighboring RF nodes (e.g., 4 and 9) is within range to directly transmit and receive network packets to and from the respective RF node (e.g., 1) over the flooding wireless network 25. For each respective RF node (e.g., 1-3, 5-8, 10-12), the respective neighbor relationship status (515A-C, 515E-H, 515K-L) is unset to indicate each of one or more non-neighboring RF nodes (e.g., 1-3, 5-8, 10-12) is not within range to directly transmit and receive network packets to and from the respective RF node (e.g., 1) over the flooding wireless network 25.

Figure 6:
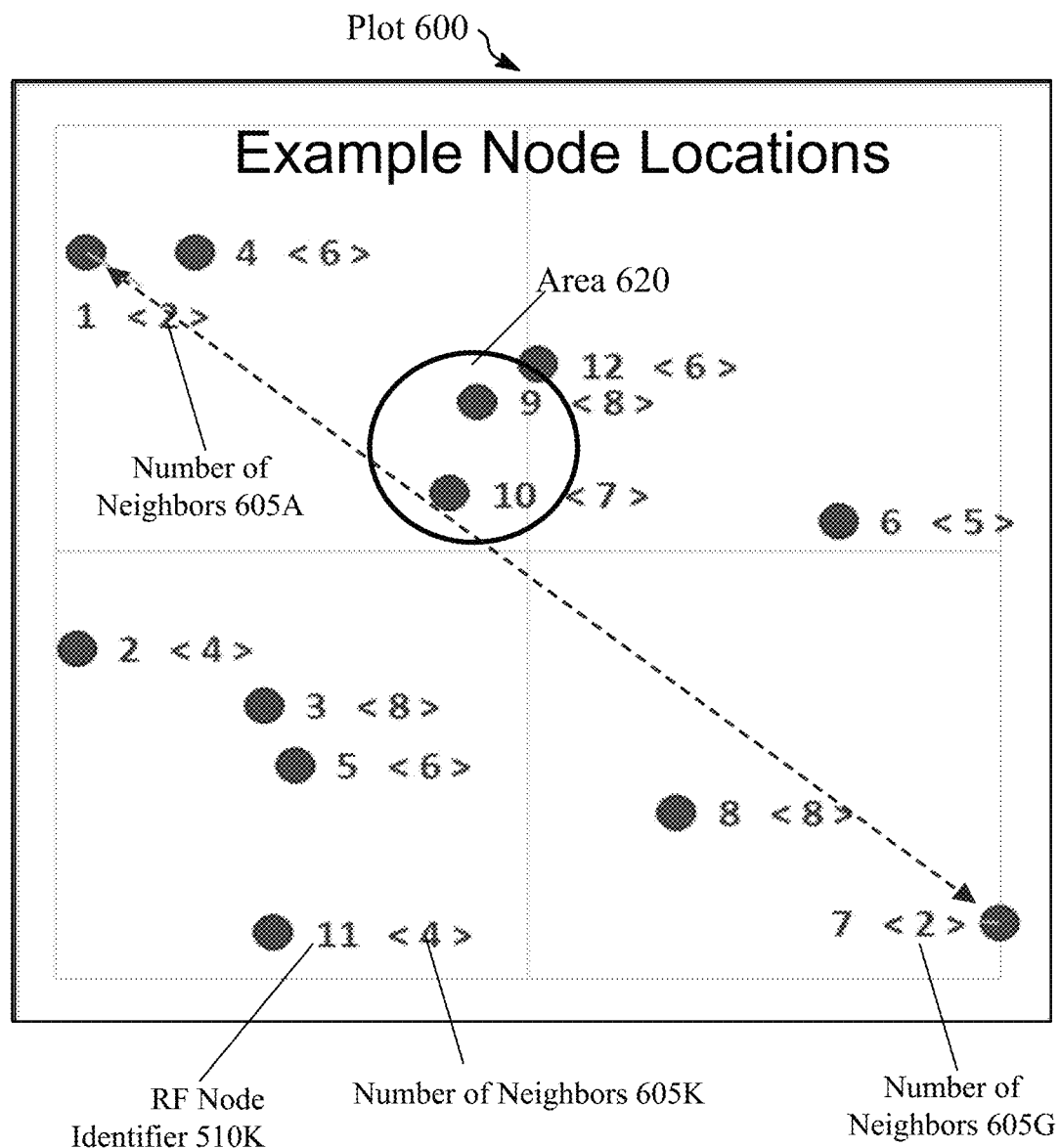
FIG. 6 is a plot of locations of RF nodes on-premises in the physical space.

Continuing to block 410 (and as shown in FIGS. 6-7), the matrix repeater designation protocol 400 includes based on the built RF node neighbor relationship matrix 500, determining a respective number of neighbors 605A-L for each respective RF node 1-12. Proceeding to block 420, the matrix repeater designation protocol 400 includes generating an RF node repeater matrix 900 (shown in FIGS. 9-13). The RF node repeater matrix 900 is generated by the following sub-blocks. First, (a) for each RF node determined to have two neighbors, designating each neighbor of the determined RF node as repeater. Second (b) assigning at least two designated repeaters of network packets over the flooding wireless network 25 for each respective RF node 1-12 having two or more RF node neighbors by: from among RF nodes not yet designated as repeaters, selecting one or more neighbors of any RF nodes not yet having at least two neighbors and designating each selected RF node as a repeater, such that each RF node has at least two neighbors designated as repeaters.

Finishing in block 430, the matrix repeater designation protocol 400 includes based on the RF node repeater matrix 900, configuring the designated RF nodes to act as repeaters.

FIG. 5 is the RF node neighbor relationship matrix 500 built in the first block 405 of the matrix repeater designation protocol 400. An RF node identifier 510A-L (e.g., 1-12) is shown along the headings of the X axis and the Y axis of the RF node neighbor relationship matrix 500. As further shown, the respective neighbor relationship status 515A-L, 516A-L 526A-L is shown inside the RF node neighbor relationship matrix 500 for each respective RF node 1-12 to other RF nodes. A neighbor relationship status (e.g., 515I) equal to the number 1 indicates that the neighbor relationship status (e.g., 515I) is set. A neighbor relationship status (e.g., 515A) equal to the number 0 indicates that the neighbor relationship status (e.g., 515A) is unset. The RF node neighbor relationship matrix 500 shows that RF node 9 and RF node 10 are neighbors, signified by the number 1 in the encircled areas corresponding to neighbor relationship status 523J, 524I.

On the left column of the RF node neighbor relationship matrix 500, RF nodes 1-12 are shown. RF node 1 only connects to two other nodes (RF nodes 4, 9) and RF node 7 only connects to two other RF nodes (RF nodes 6, 8). This RF node neighbor relationship matrix 500 demonstrates how each RF node 1-12 can communicate so RF node 1 can only communicate with RF nodes 4 and RF node 9. Looking down the column for RF node 1, it is the same down that column—only RF nodes 4 and 9 can be reached—it is symmetric.

FIG. 6 is a plot 600 of locations of RF nodes 1-12 on-premises in the physical space 21. Hypothetical placements of the RF nodes 1-12 in the physical space 21 are represented in the plot 600 with four quadrants. The RF node identifier 510A-L (e.g., 1-12) is followed by the determined respective number of neighbors 605A-L enclosed by a less than and greater than sign. Number of neighbors 605A-L is a count of how many neighbors. The respective number of neighbors 605A-L is determined in block 410 of the matrix repeater designation protocol 400 based on the RF node neighbor relationship matrix 500.

In the plot 600, RF node 9 and RF node 10 reside in the encircled area 620, and are close to each other. The plot 600 also shows RF node 1 and RF node 7 located at the corners of the physical space 21 and having the fewest connections. RF node 1 happens to be in the upper left part of the plot 600 and the number of neighbors 605A of RF node 1 is equal to two. As shown, RF node 7 just has two neighbors as shown by number of neighbors 605G. RF node 1 and RF node 7 are far off so that is why these RF nodes only have two neighbors. If the goal is of the matrix repeater designation protocol 400 is to make sure every RF node has two neighbors that are repeaters, and there are only two neighbors, then both neighbors are made repeaters. If there is only one neighbor, then the rule is violated and only 1 neighbor can be a repeater.

FIG. 7 shows the RF node neighbor relationship matrix 500 alongside a count of number of neighbors 605A-L for each of the RF nodes 1-12. RF node 1 only has two neighbors, which are RF node 4 and RF node 9, as indicated by setting of the neighbor relationship statuses 515D and 515I. RF node 7 also only has two neighbors, which are RF node 6 and RF node 8, as indicated by setting of the neighbor relationship statuses 521G and 521H. Since RF node 1 and RF node 7 only have two neighbor connections, as indicated by number of neighbors 605A and 605G, those neighbors (RF nodes 4, 6, 8, and 9) must be designated repeaters. Therefore, RF nodes 4, 6, 8, and 9 should be designated repeaters in block 420 of the matrix repeater designation protocol 400 based on the generated RF node repeater matrix 900.

As shown in FIGS. 6-7, determining the respective number of neighbors 605A-L for each respective RF node 1-12 in block 410 of the matrix repeater designation protocol 400 of FIG. 4 includes counting each respective neighbor relationship status 515A-L, 516A-L, 526A-L that is set per RF node. Setting of the neighbor relationship status 515A-L, 516A-L, 526A-L indicates that the one or more neighboring RF nodes is within range to directly transmit and receive network packets to and from the respective RF node 1-12 over the flooding wireless network 25.

FIG. 8 shows how the number of neighbors 605A-L affects the designation of repeaters to satisfy the constraint of the matrix repeater designation protocol 400 that each of RF nodes 1-12 has at least two repeater neighbors. Note that FIG. 8 corresponds to block 420 of the matrix repeater designation protocol 400. Based on RF nodes 4, 6, 8, and 9 being designated repeaters, a respective number of repeaters 805A-L is calculated for each respective RF node 1-12. As shown, if only RF nodes 4, 6, 8, and 9 are designated repeaters, then many RF nodes with at least two neighbors are selected as repeaters. In particular, RF nodes 1, 3, 5-10, and 12 have a sufficient number of repeaters (N≥2). However, more repeaters still need to be designated because three RF nodes—RF nodes 2, 4, and 11—do not have a sufficient number of repeaters (N=1), in other words fewer than two neighbor repeaters.

FIG. 9 shows the determination of a number of connections 925A-L for RF nodes 1-12 and a first example calculation of potential repeater scores 930A-L of the matrix repeater designation protocol 400. Note that FIG. 9 corresponds to block 420 of the matrix repeater designation protocol 400. The whited out neighbor relationship statuses, such as 515A for RF node 1 and 526A for RF node 12, are either for RF nodes that have at least two designated repeaters (along the left column—Y axis) or for RF nodes that are already assigned to be repeaters (along top row—X axis). Hence, only the setting or unsetting of respective neighbor relationship statuses 516A-L, 518A-L, and 525A-L are shown and factored in calculating a respective number of connections 925A-L. In this first example calculation, the respective potential repeater score 930A-L is equivalent to the respective number of connections 925A-L.

The goal of continuing the assignment of repeater RF nodes, at this point, is to make sure RF nodes 2, 4, and 11 get two or more neighbor repeaters, meaning one more each. For all of RF nodes, the number of neighbor repeaters is sufficient. Therefore, new repeater RF nodes are chosen only with only RF nodes 2, 4, and 11 factored into account.

As shown in the example of FIG. 9, the potential repeater score 930A-L is calculated by summing up the number of connections 925A-L for each possible repeater, that is RF nodes 1, 3, 5, and 10-12. Already assigned repeaters are ignored and neighbor connections that already have two repeater neighbors are not counted. As shown, RF node 3 has the highest potential repeater score 930C and is neighbors to all three remaining RF nodes 2, 4, and 11. Accordingly, assigning RF node 3 as a repeater completes block 420 of the matrix repeater designation protocol 400 of FIG. 4.

FIG. 10 depicts a second example calculation of potential repeater scores 930A-L of the matrix repeater designation protocol 400. As shown in the example of FIG. 10, selecting one or more neighbors of any RF nodes not yet having at least two neighbors, that is RF nodes 2, 4, and 11 and designating each selected RF node as the repeater can include the following steps. Step (a) for each of undesignated RF nodes 1, 3, 5, and 10-12 that are potential repeaters (e.g., not designated as repeaters and not already assigned at least two designated repeaters), calculating a respective potential repeater score 930A-L. Step (b) designating one or more of the undesignated RF nodes with a highest respective potential repeater score 930C as a repeater. Step (c) repeating steps (a) and (b) until each of the RF nodes having two or more RF node neighbors is assigned at least two designated repeaters. Calculating the respective potential repeater score 930A-L includes the following. First, adjusting the respective potential repeater score 930A-L of the undesignated RF nodes to be more favorable to being designated repeater based on the respective number of neighbors 605A-L being low (e.g., by setting weights). Second, adjusting the respective potential repeater score 930A-L of the undesignated RF nodes to be less favorable to being designated repeater based on the respective number of neighbors 605A-L being high (e.g., by setting weights).

Calculating the respective potential repeater score 930A-L can include determining a respective number of connections 925A-L by subtracting from the respective number of neighbors 605A-L each of the RF nodes already assigned at least two designated repeaters or designated as repeaters (RF nodes 1, 3, 5-10, and 12). Calculating the respective potential repeater score 930A-L can further include dividing a constant value (e.g., 1) by the respective number of connections 925A-L (NumConnections$_x$) to calculate the respective potential repeater score 930A-L.

Figure 11:
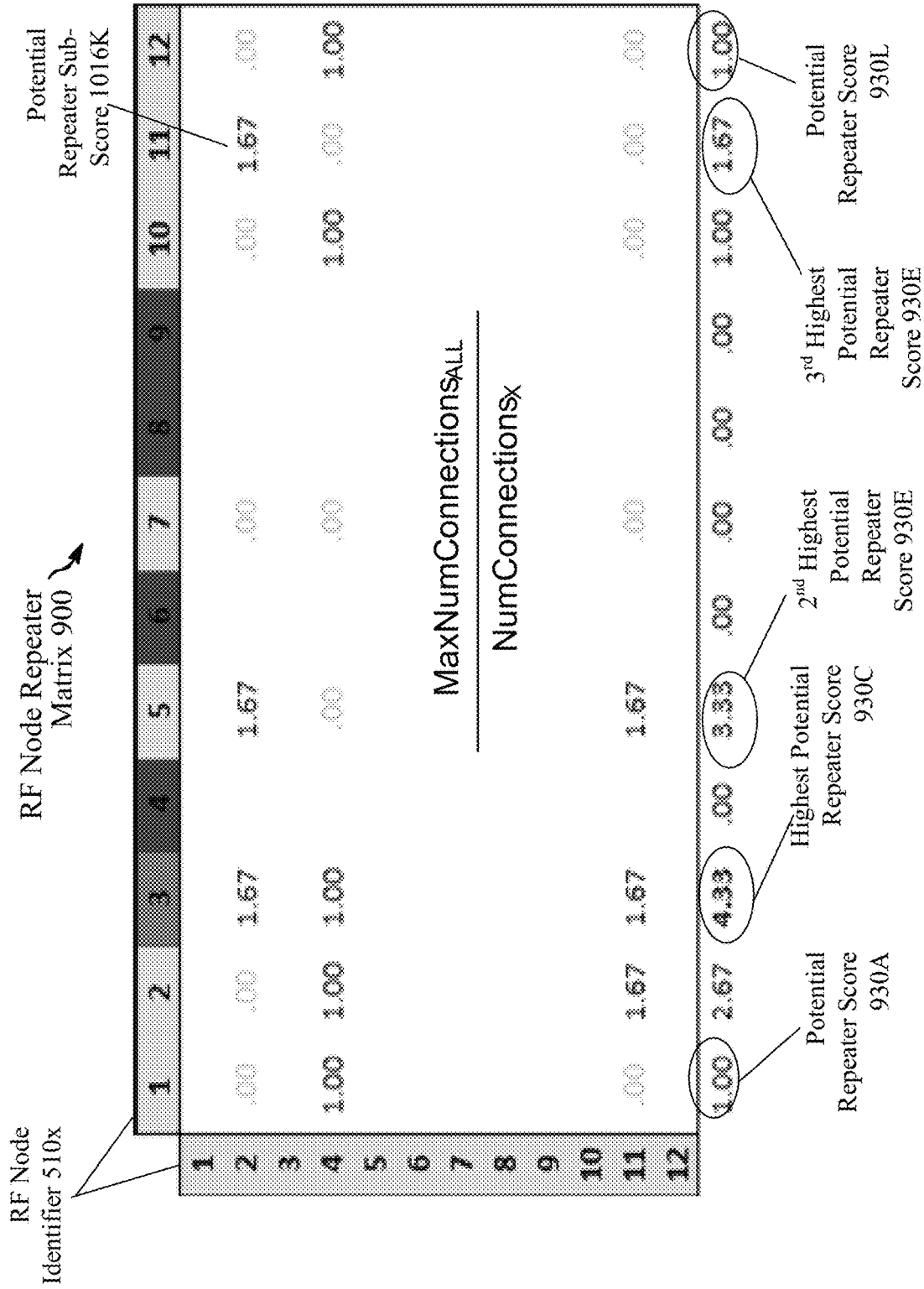
FIG. 11 depicts a third example calculation of potential repeater scores of the matrix repeater designation protocol.

FIG. 11 depicts a third example calculation of potential repeater scores 930A-L of the matrix repeater designation protocol 400. As shown, calculating the respective potential repeater score 930A-L further includes determining a maximum number of connections (MaxNumConnections$_{ALL}$) by summing up each of the respective number of connections 925A-L. Calculating the respective potential repeater score 930A-L further includes dividing the respective number of connections 925A-L by the maximum number of connections (MaxNumConnections$_{ALL}$) to calculate the respective potential repeater score 930A-L.

As shown in FIGS. 9-11, the potential repeater score 930A-L can be refined by taking into account how many number of connections 925A-L (neighbor connections) each RF node 1-12 has. For example, instead of treating each connection with the same weight, those neighbor RF nodes with fewer connections could be given higher weight. In FIG. 10, the potential repeater sub-score 1015A-L 1026A-L could be {1/#connections}, as shown. While in FIG. 11, the potential repeater sub-score 1015A-L 1026A-L was calculated from {(Max #conn)/#connections}. Using both calculations in FIGS. 10-11, RF node 3 has the highest potential repeater score 930C from the potential repeater scores 930A-L.

Figure 12:
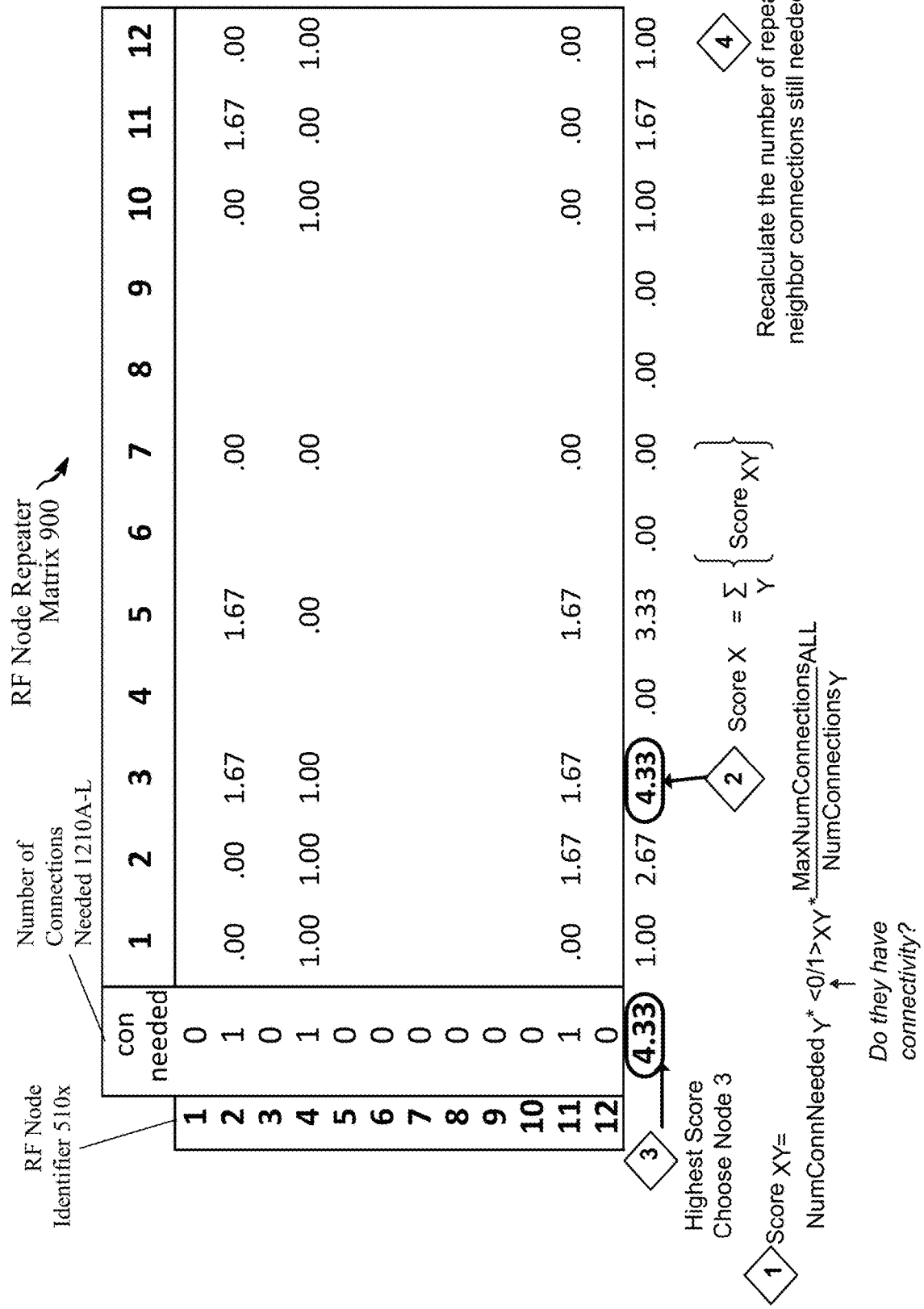
FIG. 12 depicts a fourth example calculation of potential repeater scores of the matrix repeater designation protocol and provides a procedural flow.

FIG. 12 depicts a fourth example calculation of potential repeater scores 930A-L of the matrix repeater designation protocol 400 and provides a procedural flow of the four example calculation. As shown, the potential repeater score 930A-L can take into account the number of connections needed 1210A-L per RF node. In step one, the number of connections needed 1210B, 1210, and 1210K are determined to be equal to one for RF nodes 2, 4, and 11, respectively. Whereas, number of connections 1201A, 1210C, 1210E-J, and 1210L are determined to be zero for RF nodes 1, 3, 5-10, and 12. In step two, the potential repeater score 930A-L is then calculated. In step three, RF node 3 is determined to have the highest potential repeater score 930C. In step four, the number of connections needed 1210A-L is recalculated until each RF node 1-12 of the flooding wireless network 25 has at least two neighboring RF nodes designated as repeaters.

FIG. 13 depicts a fifth calculation of repeater scores 930A-L of the matrix repeater designation protocol 400. Following is a summary of the steps of the matrix repeater designation protocol 400. First, the matrix repeater designation protocol 400 includes assigning the neighbors as repeaters to all RF nodes that are neighbors to RF nodes that have only one or two connections. Second, given the current set of repeater nodes, the matrix repeater designation protocol 400 includes calculating a score for every potential repeater based on: (a) the number of its neighbor nodes that still do not have two or more neighbor repeaters. This really is first calculating the sum of the sub-scores 1015A-L 1026K-L by column. Third, the matrix repeater designation protocol 400 includes determining how many neighbors are still needed, i.e. a neighbor node that still needs 2 neighbor repeaters adds more to the score than a neighbor that still needs only one neighbor repeater. Of course, RF nodes that do not need any more repeater neighbors do not add to the score. Fourth, the matrix repeater designation protocol 400 includes determining how isolated, i.e. the fewer number of possible connections, are the nodes that are connected. The more isolated, the more likely to pick. Fifth, the matrix repeater designation protocol 400 includes designating the node with the highest score a repeater. Sixth, the matrix repeater designation protocol 400 includes repeating steps two through five until each RF node has at least two repeater neighbors.

FIG. 14 is a flow chart of a method of the decentralized repeater designation protocol 1400 (e.g., implemented in decentralized repeater designation programming of FIGS. 20-23) for designating some but not all of the RF nodes 1-12 of the flooding wireless network 25 as repeaters. In the decentralized repeater designation protocol 1400, the RF node neighbor relationship matrix 500 is not built. The method of FIG. 14 is implemented as sub-steps of block 305 of the general repeater designation protocol 300 of FIG. 3. This decentralized repeater designation protocol 1400 is implemented as a network protocol executed in in each of the RF nodes 1-12, including the luminaires 1-8, gateway 9, lighting control device 10, plug load controller 11, and power pack 12.

Beginning in block 1405, the decentralized repeater designation protocol 1400 includes having each RF node 1-12 transmit to other RF nodes, a neighbor relationship status message. Continuing to block 1410, in response to receiving a reply message to the neighbor relationship status message at each respective RF node 1-12 from a respective first subset of other RF nodes within a predetermined timeout period (e.g., 1 second), the respective RF node 1-12 implements the following. First, the respective RF node 1-12 establishes that each of the respective first subset of other RF nodes are within range to directly transmit and receive network packets to and from the respective RF node 1-12 over the flooding wireless network 25. Second, the respective RF node 1-12 stores a respective RF identifier 510A-L of each of the respective first subset of other RF nodes in a respective RF node neighbor list 2044 to establish neighbor relationship status.

Proceeding to block 1420, the decentralized repeater designation protocol 1400 includes in response to failing to receive the reply message to the neighbor relationship status message from a respective second subset of the other RF nodes within the predetermined timeout period (e.g., 1 second), the respective RF node 1-12 implements the following. First, the respective RF node 1-12 establishes that the respective second subset of other RF nodes are not within range to directly transmit and receive network packets to and from the respective RF node 1-12 over the flooding wireless network 25. Second, the respective RF node 1-12 stores a respective RF node identifier of each of the respective second subset of other RF nodes in a respective non-neighbor RF node list 2046 to establish non-neighbor relationship status.

In block 1430, the decentralized repeater designation protocol 1400 includes based on the respective RF node neighbor list 2044, for each respective RF node 1-12, determining a respective number of neighbors 605A-L. Continuing to block 1440, the decentralized repeater designation protocol 1400 includes in response to determining that the respective number of neighbors 605A-L is set to one or two for the respective RF node 1-12, transmitting a repeater designation message 2043x to each respective RF node identifier in the respective RF node neighbor list 2044 to designate the respective first subset of other RF nodes as repeaters. Finishing now in block 1450, the decentralized repeater designation protocol 1400 includes assigning at least two designated repeaters of network packets over the flooding wireless network 25 for each respective RF node 1-12 having two or more neighbor RF nodes.

Figure 15:
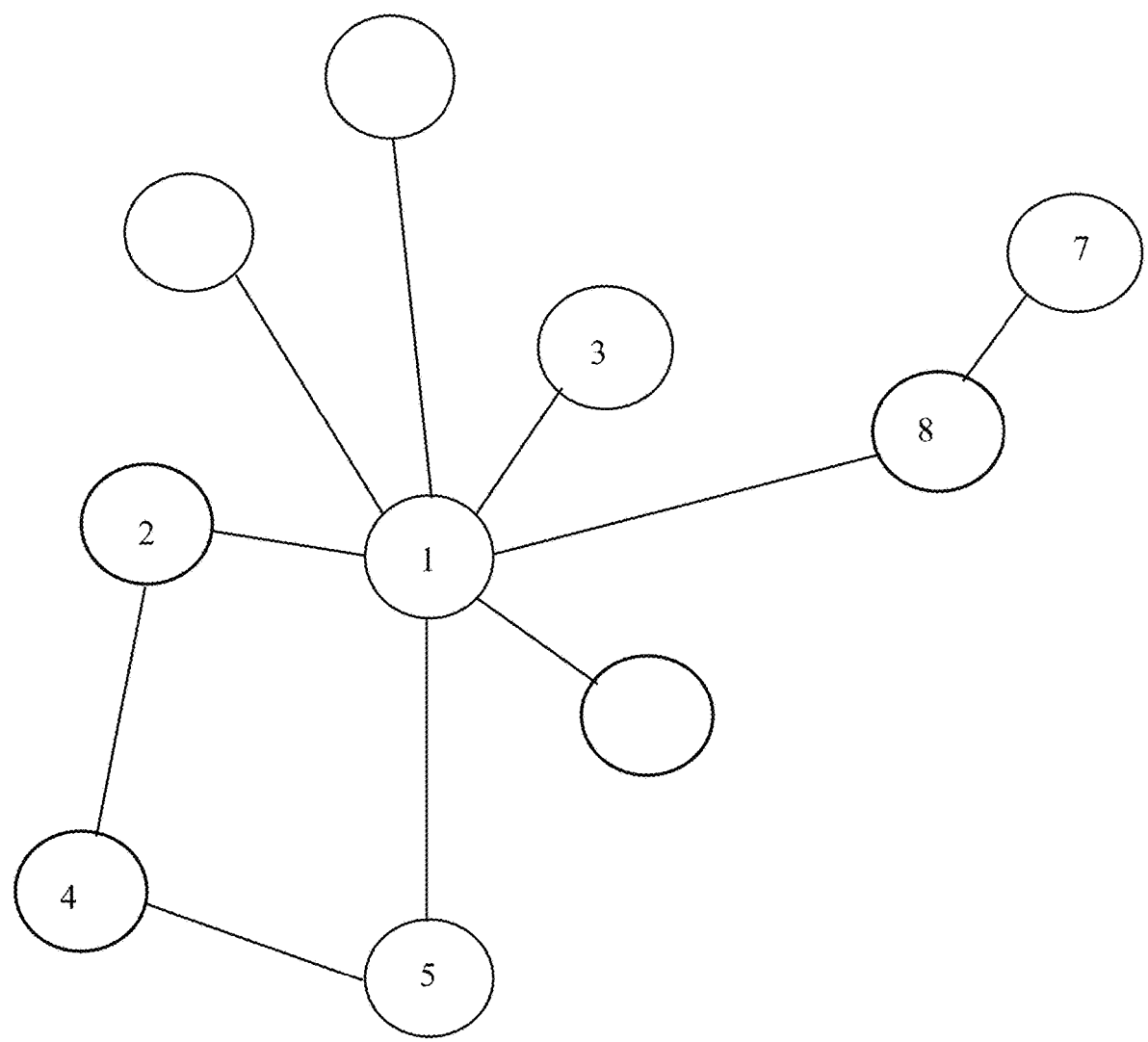
FIG. 15 is a schematic depicting the first block of the decentralized repeater designation protocol.

FIG. 15 is a schematic depicting the first block 1405 of the decentralized repeater designation protocol 1400 of FIG. 14. As shown in FIG. 15 instead of building an RF node neighbor relationship matrix 500 and generating an RF node repeater matrix 900, it is assumed that each RF node 1-12 has limited information. Namely, that limited information is: (a) each RF node knows how many connections (number of connections 925A-L) it has and whether it has been made a repeater; and (b) for each connection, each RF node 1-12 knows whether it's neighbor has become a repeater and how many connections it has. This limited information is determined with neighbor relationship status messages, which can be multicast ping messages, from each RF node with a timeout of 1 second. That is, these neighbor relationship status messages do not need to be repeated. By default, all RF nodes are repeaters, until the of the decentralized repeater designation protocol 1400 has concluded.

Figure 16:
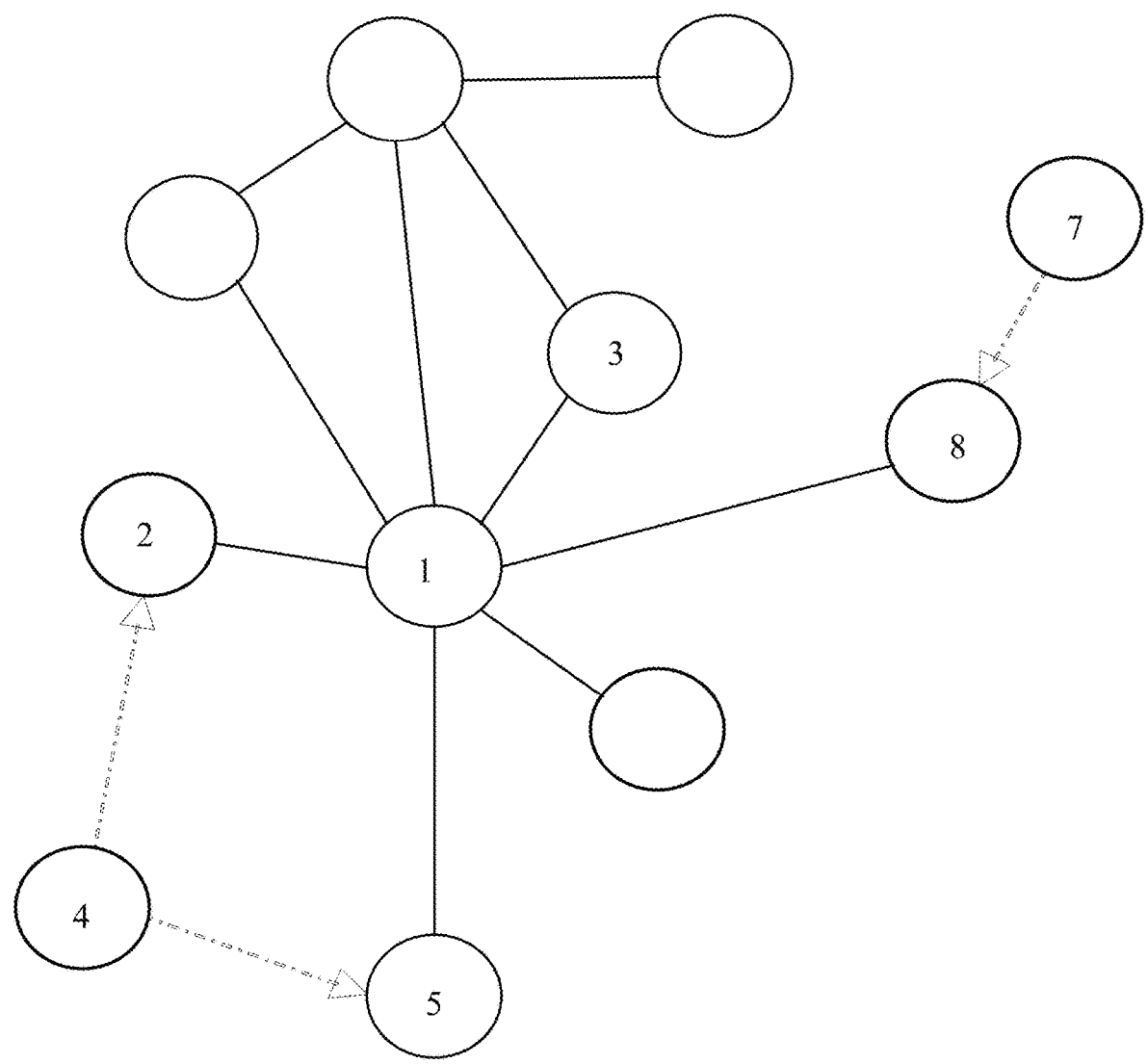
FIG. 16 is a schematic depicting the second through fifth blocks of the decentralized repeater designation protocol.

FIG. 16 is a schematic depicting the second through fifth blocks 1410, 1420, 1430, and 1440 of the decentralized repeater designation protocol 1400 of FIG. 14. As shown in FIG. 16, it is assumed again that the goal is to have every RF node be connected to 2 repeaters (N≥2). If an RF node is only connected to one RF node, the decentralized repeater designation protocol 1400 will continue with the goal of one repeater. Starting with RF nodes that have only 1 or 2 connections, those RF nodes send a message to those connections (repeater designation messages 2043x) telling them to become repeaters (block 1440).

As shown, RF node 4 has two connections, so a repeater designation message 2043x is transmitted to RF nodes 2 and 5, making RF nodes 2 and 4 designated repeaters.

Figure 17:
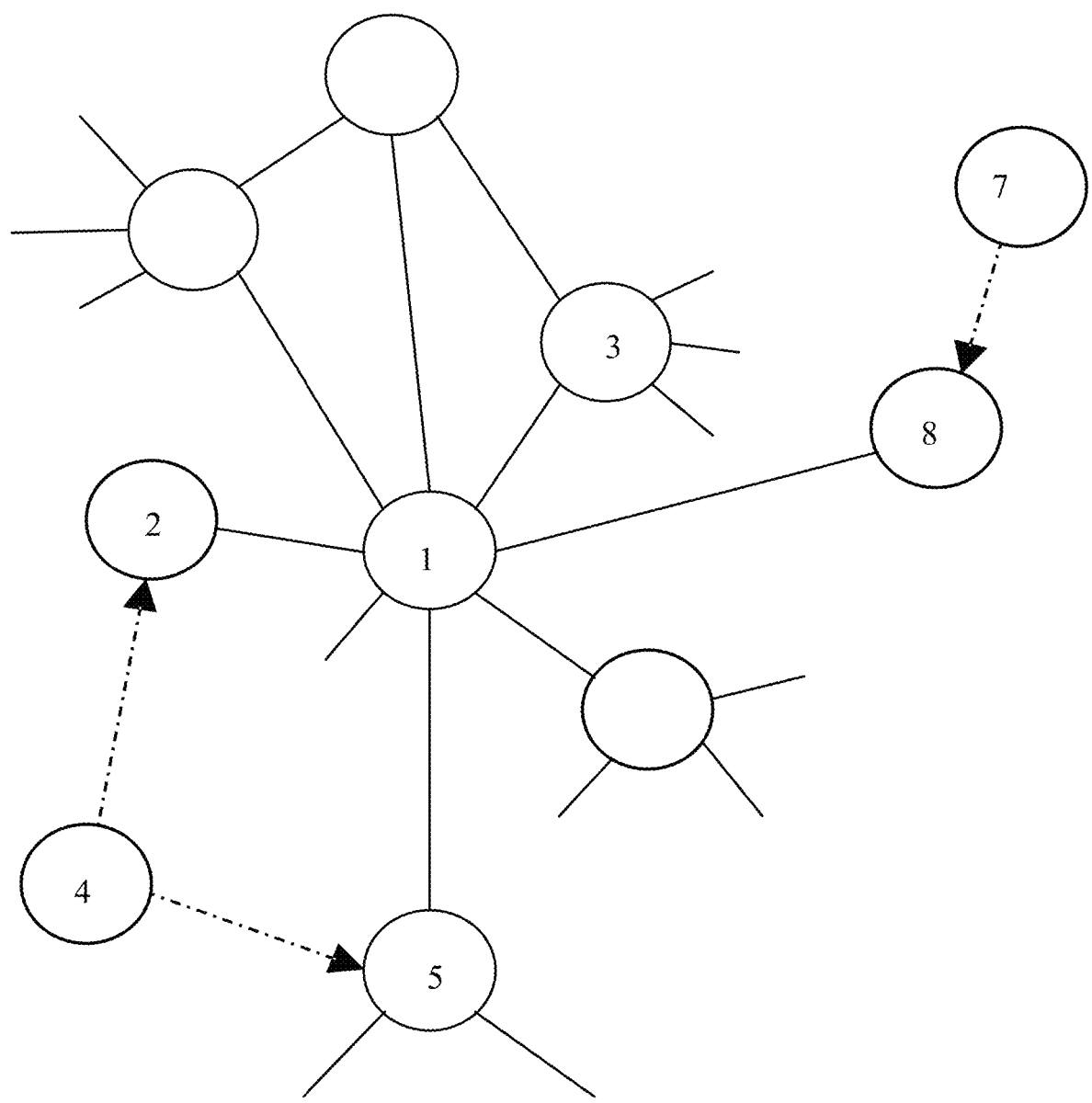
FIG. 17 is a schematic depicting the sixth block of the decentralized repeater designation protocol.

FIG. 17 is a schematic depicting the sixth block 1450 of the decentralized repeater designation protocol 1400 of FIG. 14. At some point, RF nodes 1-12 with 3 connections begin their process. The RF nodes with 3 connections send a message to those RF nodes asking whether they are repeaters and how many connections they have. RF nodes with 3 connections determine how many repeaters they still need as connections, because some could already be assigned. Each chooses the repeater RF nodes based on the number of connections 925A-L they have. After the RF nodes with 3 connections have completed this step, RF nodes with more number of connections 925A-L perform the same function. This procedure continues until every RF node has 2 repeaters as connections. At some point, it may make sense to allow RF nodes with different numbers of connections 925A-L to go at the same time, e.g. all nodes with 5 or 6 connections.

Assigning at least two designated repeaters of network packets over the flooding wireless network 25 for each respective RF node 1-12 having two or more neighbor RF nodes includes the following. In response to determining that the respective number of neighbors 605A-L is three or more for the respective RF node 1-12, transmitting from each respective RF node 1-12 to each of the respective first subset of other RF nodes having the respective RF node identifier stored in the respective RF node neighbor list 2044, a respective repeater status and connection number request message 2041A-L.

In the example, the neighbor relationship status message can be a respective repeater status and connection number request message 2041A-L that requests a repeater status and connection number response message 2042A-L as the reply message. The reply message, for example, is a repeater status and connection number response message 2042A-L that indicates whether a respective one of the respective first subset of other RF nodes is of a designated repeater status and a respective number of connections 925A-L. Assigning at least two designated repeaters of network packets over the flooding wireless network 25 for each respective RF node 1-12 having two or more neighbor RF nodes further includes: assigning the respective one of the respective first subset of other RF nodes when the repeater status and connection response message 2042A-L indicates the designated repeater status.

Assigning at least two designated repeaters of network packets over the flooding wireless network 25 for each respective RF node 1-12 having two or more neighbor RF nodes further includes calculating a respective potential repeater score 930A-L for the respective one of the first subset of other RF nodes by the following. First, adjusting the respective potential repeater score 930A-L to be more favorable to being designated repeater based on the respective number of connection being low. Second, adjusting the respective potential repeater score 930A-L to be less favorable to being designated repeater based on the respective number of connections 925A-L being high.

Figure 18:
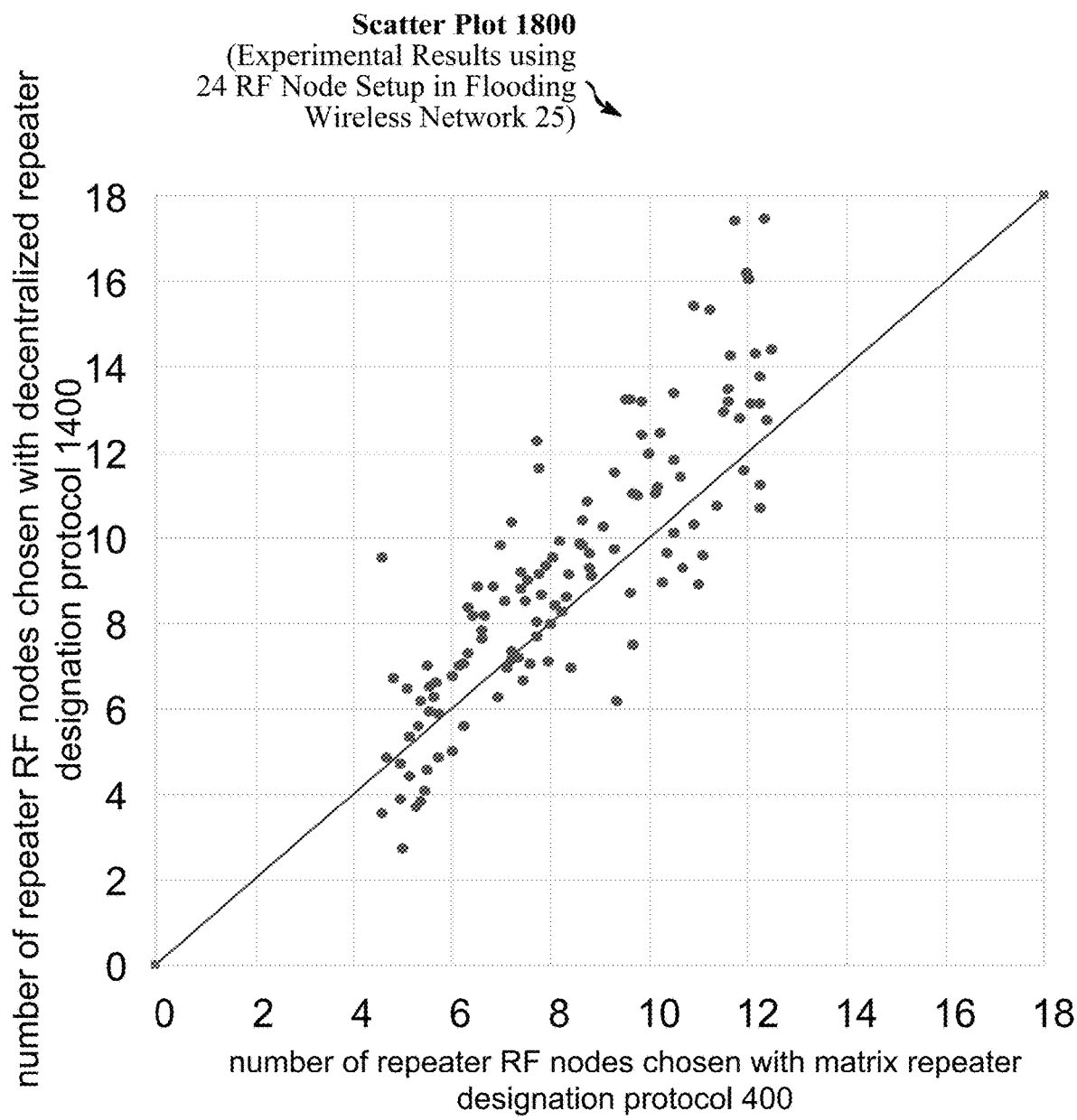
FIG. 18 is a scatter plot of the number of RF nodes designated repeaters using the matrix repeater designation protocol and the decentralized repeater designation protocol.

FIG. 18 is a graph that shows a scatter plot 1800 of the number of RF nodes designated repeaters using the matrix repeater designation protocol 400 of FIG. 4 (e.g., implemented in matrix repeater designation programming of FIG. 19) and the decentralized repeater designation protocol 1400 (e.g., implemented in decentralized repeater designation programming of FIGS. 20-23). The experiment parameter was a 24 RF node setup using arbitrary connections between the RF nodes of the flooding wireless network 25. Jitter is added to the counts of the scatter plot 1800 to show intensity. For example, if the actual number of repeaters is 10, the counts can be random between 9.5 and 10.5. The scatter plot 1800 shows that the matrix repeater designation protocol 400 performs slightly better than the decentralized repeater designation protocol 1400.

The diagonal line of the scatter plot 1800 is X=Y. If the matrix repeater designation protocol 400 and the decentralized repeater designation protocol 1400 were completely equivalent all dots would be on the diagonal line. If dots were all below the diagonal line, this would indicate that the matrix repeater designation protocol 400 always chose (designated) more RF nodes as repeaters. If dots were all above the diagonal line, then this would indicate that the decentralized repeater designation protocol 1400 always chose more RF nodes as repeaters. The scatter plot 1800 shows that more than 18 repeaters were never designated, so both the matrix repeater designation protocol 400 and the decentralized repeater designation protocol 1400 are more efficient than a complete uncontrolled flood network. An uncontrolled flood network would have 24 repeaters. So at least six RF nodes are not repeating in both the matrix repeater designation protocol 400 and the decentralized repeater designation protocol 1400, and sometimes as few as only 2-3 repeaters are designated from the 24 RF nodes.

FIG. 19 is a functional block diagram of the gateway RF node 9, by way of just one example of a computing device platform that may perform the functions of the network controller 1900. Although the gateway 9 implements the network controller 1900 in the example any of the other RF nodes 1-8 and 10-12 can implement the network controller 1900. For example, the network controller 1900 can be an integrated luminaire (or a standalone touchscreen device 2100B of FIG. 21B). If the network controller 1900 is a luminaire, then network controller 1900 is line powered and remains operational as long as power is available. Alternatively, if network controller 1900 is a touch screen type device 2100B as described in FIG. 21B, network controller 1900 may be battery powered.

Gateway 9 will generally be described as an implementation of a server or host type computer, e.g. as might be configured as a blade device in a server farm or in network room of a particular premises. Gateway 9 may comprise a mainframe or other type of host computer system. As shown, gateway 9 includes a wireless network interface 1958 to and from the flooding wireless network 25 on-premises to RF nodes 1-8 and 10-12 installed in the physical space 21. Gateway 9 also includes another network communication interface 1959 for off-premises network communications over the WAN 55.

The gateway 9 in the example includes a central processing unit (CPU) 1952 formed of one or more processors, a main memory 1935, mass storage 1955, and an interconnect bus 1954. The circuitry forming the CPU 1952 may contain a single microprocessor, or may contain a number of microprocessors for configuring the computer system as a multi-processor system, or may use a higher speed processing architecture. The main memory 1935 in the example includes ROM, RAM and cache memory; although other memory devices may be added or substituted. Although semiconductor memory may be used in the mass storage devices 1955, magnetic type devices (tape or disk) and optical disk devices may be used to provide higher volume storage. In operation, the main memory 1935 stores at least portions of instructions and data for execution by the CPU 1952, although instructions and data are moved between memory 1935 and storage 1955 and the CPU 1952 via the interconnect bus 1954.

The gateway 9 also includes one or more input/output interfaces for communications, shown by way of example as interface 1959 for data communications via the WAN 55 as well as a WiFi or Bluetooth type wireless transceiver 1958 for communications over the flooding wireless network 25. Network communication interface 1959 may be a high-speed modem, an Ethernet (optical, cable or wireless) card or any other appropriate data communications device. The physical communication link(s) to/from the network communication interface 1959 may be optical, wired, or wireless (e.g., via satellite or cellular network). Although other transceiver arrangements may be used, the example gateway 9 utilizes a WiFi or Bluetooth type wireless transceiver 1958 similar to the other RF nodes 1-8 and 10-12 for communication over the flooding wireless network 25. The wireless transceiver 1958 enables the gateway 120 to communicate over-the-air with the WiFi type wireless transceivers 2045 of RF nodes 1-8 and 10-12 of the lighting system 20 via the flooding wireless network 25.

Although not shown, the computer platform configured as the gateway 9 may further include appropriate input/output ports for interconnection with a local display and a keyboard and mouse or with a touchscreen or the like, serving as a local user interface for configuration, programming or trouble-shooting purposes. Alternatively, the operations personnel may interact with the computer system of the gateway 9 for control and programming of the system from remote terminal devices via the Internet or some other link via WAN 55.

The gateway 9 runs a variety of applications programs and stores various information in a database or the like for control of the fixtures, wall controllers, and any other elements of the lighting system 20 and possibly elements of an overall building managements system (BMS) at the premises. One or more such applications, for example, might enable asset tracking, lighting control through the gateway 9 and/or lighting control based on input from the sensors or wall controllers.

In the example of FIG. 19, the gateway 9 implements the network controller 1900. The network controller 1900 includes a wireless transceiver 1958 configured for data communication over a flooding wireless network 25 that includes a plurality of radio frequency (RF) nodes 1-8 and 10-12. Network controller 1900 includes a processor 1925 coupled to the wireless transceiver 1958 and a memory 1935 accessible to the processor 1952. The network controller 1900 includes matrix repeater designation programming 1990 in the memory.

Execution of the matrix repeater designation programming 1990 by the processor 1952 configures the network controller 1900 to implement the matrix repeater designation protocol 400 described generally in FIG. 3 and more specifically in FIGS. 4-13, including the following functions. First, based on neighbor relationships among radio frequency (RF) nodes 1-12 of a flooding wireless network 25, network controller 1900 designates some but not all of the RF nodes 1-12 as repeaters. The designating some but not all of the RF nodes as repeaters selects (RF) nodes as repeaters such that each RF node of the flooding wireless network 25 has at least two neighboring RF nodes designated as repeaters. Second, network controller 1900 configures designated RF nodes to act as repeaters to receive and resend network packet transmissions from other RF nodes through the flooding wireless network 25. Third, network controller 1900 configures all RF nodes not designated as repeaters not to resend network packet transmissions from other RF nodes through the flooding wireless network 25.

As shown, the memory 1935 stores: (i) an RF node neighbor relationship matrix 500, and (ii) an RF node neighbor repeater matrix 900. Memory 1935 further stores an RF node identifier database 1940, which includes the respective RF node identifier 510A-L of the respective RF node 1-12 itself and other RF nodes for network communication purposes over the flooding wireless network 25.

Designating some but not all of the RF nodes as repeaters includes the following. First, building the RF node neighbor relationship matrix 500 that includes a respective neighbor relationship status 515A-L, 516A-L, . . . 526A-L of each respective RF node 1-12 to other RF nodes. For each respective RF node 1-12, the respective neighbor relationship status 515A-L, 516A-L, . . . 526A-L is set to indicate each of one or more neighboring RF nodes is within range to directly transmit and receive network packets to and from the respective RF node 1-12 over the flooding wireless network 25. For each respective RF node 1-12, the respective neighbor relationship status is unset to indicate each of one or more non-neighboring RF nodes is not within range to directly transmit and receive network packets to and from the respective RF node 1-12 over the flooding wireless network 25. Second, based on the built RF node neighbor relationship matrix 500, determining a respective number of neighbors 605A-L for each respective RF node 1-12. Third, generating an RF node repeater matrix 900 by: (i) for each RF node determined to have two neighbors, designating each neighbor of the determined RF node as repeater; (ii) assigning at least two designated repeaters of network packets over the flooding wireless network 25 for each respective RF node 1-12 having two or more RF node neighbors by: from among RF nodes not yet designated as repeaters, selecting one or more neighbors of any RF nodes not yet having at least two neighbors and designating each selected RF node as a repeater, such that each RF node has at least two neighbors designated as repeaters. Fourth, based on the RF node repeater matrix 900, configuring the designated RF nodes to act as repeaters.

Selecting one or more neighbors of any RF nodes not yet having at least two neighbors and designating each selected RF node as the repeater includes the following steps. Step (a) for each of undesignated RF nodes that are potential repeaters (e.g., not designated as repeaters and not already assigned at least two designated repeaters), calculating a respective potential repeater score. Step (b) designating one or more of the undesignated RF nodes with a highest respective potential repeater score as a repeater. Step (c) repeating steps (a) and (b) until each of the RF nodes having two or more RF node neighbors is assigned at least two designated repeaters.

Calculating the respective potential repeater score 930A-L includes the following. First, adjusting the respective potential repeater score 930A-L of the undesignated RF nodes to be more favorable to being designated repeater based on the respective number of neighbors 605A-L being low. Second, adjusting the respective potential repeater score 930A-L of the undesignated RF nodes to be less favorable to being designated repeater based on the respective number of neighbors 605A-L being high.

The example of FIG. 19 shows a single instance of gateway 9. Of course, the gateway functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the gateway 9 generally are conventional in nature, and it is presumed that those skilled in the art are sufficiently familiar therewith to understand implementation of the present system and associated lighting control technique using suitable configuration and/or programming of such computer system (s).

FIG. 20 is a block diagram of a luminaire 2000 configured as RF nodes 1-8 that communicate via the flooding wireless network 25 in the lighting system of FIG. 1. In FIG. 20, drive/sense circuitry 2055 and detectors 2060 are on-board the luminaire 2000. Detectors 2060 can be infrared sensors for occupancy or motion detection, an in-fixture daylight sensor, an audio sensor, a temperature sensor, or other environmental sensor. Drive/sense circuitry 2055, such as application firmware, drives the occupancy, audio, and photo sensor hardware.

Luminaire 2000 includes a power supply 2005 driven by a power source 2001. Power supply 2005 receives power from the power source 2001, such as an AC mains, battery, solar panel, or any other AC or DC source. Power supply 2005 may include a magnetic transformer, electronic transformer, switching converter, rectifier, or any other similar type of circuit to convert an input power signal into a power signal suitable for light source 2015. Light source 2015 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 2015 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

Luminaire 2000 further includes, a driver circuit 2010, for example, an intelligent light emitting diode (LED) driver circuit. Driver circuit 2010 is coupled to light source 2015 and drives that light source 2015 by regulating the power to light source 2015 by providing a constant quantity or power to light source 2015 as its electrical properties change with temperature, for example. The driver circuit 2010 provides power to light source 2015. Driver circuit 210 may be a constant-voltage driver, constant-current driver, or AC LED driver type circuit that provides dimming through a pulse width modulation circuit and may have many channels for separate control of different LEDs or LED arrays that comprise light source 2015. An example of a commercially available intelligent LED driver circuit 210 is manufactured by EldoLED®.

Driver circuit 2010 can further include an AC or DC current source or voltage source, a regulator, an amplifier (such as a linear amplifier or switching amplifier), a buck, boost, or buck/boost converter, or any other similar type of circuit or component. Driver circuit 2010 outputs a variable voltage or current to the light source 2015 that may include a DC offset, such that its average value is nonzero, and/or an AC voltage.

For purposes of communication and control, luminaire 2000 is treated as a single or a multi-addressable device that can be configured to operate as a member of the flooding wireless network 25. Luminaire 2000 includes power distribution circuitry 2025, a microprocessor 2030, and a memory 2035. As shown, microprocessor 2030 is coupled to driver circuit 2010 and the microprocessor 2030 includes a central processing unit (CPU) that controls the light source operation of the light source 2015. Memory 2035 can include volatile and non-volatile storage.

The power distribution circuitry 2025 distributes power and ground voltages to the processor 2030, memory 2035, network communication interface(s) 2045 (e.g., wireless transceivers), drive/sense circuitry 2055, and detector(s) 2060 to provide reliable operation of the various circuitry on the luminaire 2000.

Network communication interface(s) 2045 allows for data communication (e.g., wired or wireless) over various networks, including the flooding wireless network 25. For example, luminaire 2000 can includes one band, dual-band, or tri-band wireless radio communication interface system of network communication interface(s) 2045 configured for wireless communication via separate radios that operate at three different frequencies, such as sub-GHz (e.g., 900 MHz), Bluetooth Low Energy (BLE) (2.4 GHz), and 5 GHz, for example. At least one wireless transceiver 2045 is for communication over the flooding wireless network 25.

Microprocessor 2030, including like that shown for the processor/CPU 1952 of gateway 9 in FIG. 19, serve to perform various operations, for example, in accordance with instructions or programming executable by processors 1952, 2030. For example, such operations may include operations related to communications with various lighting system 20 elements, such as RF nodes 1-12 during the repeater designation procedures described herein. Although a processor 1952, 2030 may be configured by use of hardwired logic, typical processors are general processing circuits configured by execution of programming. Processors 1952, 2030 include elements structured and arranged to perform one or more processing functions, typically various data processing functions. Although discrete logic components could be used, the examples utilize components forming a programmable CPU. A processor 1952, 2030 for example includes one or more integrated circuit (IC) chips incorporating the electronic elements to perform the functions of the CPU. The processors 1952, 2030 for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in RF nodes 1-12.

Memory 2035 like that shown in FIG. 20 and memory 1935 like that shown in FIG. 19 are for storing data and programming. In the example, the main memory system 1935, 2035 may include a flash memory (non-volatile or persistent storage) and a random access memory (RAM) (volatile storage). The RAM serves as short term storage for instructions and data being handled by the processor 1952, 2030, e.g., as a working data processing memory. The flash memory typically provides longer term storage.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules.

The instructions, programming, or application(s) may be software or firmware used to implement any other device functions associated with RF nodes 1-12, including network controller 1900, luminaire 2000, wall switch 2100A, touch screen device 2100B, plug load controller 2200, and power pack 2300. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 1935, 2035, or a memory of a computer used to download or otherwise install such programming into the RF nodes 1-12, or a transportable storage device or a communications medium for carrying program for installation in the RF nodes 1-12.

As shown, the luminaire 2000 includes programming in the memory 235, which configures the processor 2030 to control operations of the light source 2015, including the communications over the network communication interface(s) 2045 via the wireless network interface(s) 2045. The programming in the memory 2035 includes lighting control programming 2039 to control the light source 2015 and decentralized repeater designation programming 2090 to implement the decentralized repeater designation protocol 1400 of FIG. 14. The memory 2035 also stores an RF node identifier database 1940 that includes a respective RF node identifier 510A-L of the luminaire 2000 itself and source RF nodes 1-12 for which the luminaire 2000 is a repeater of network packets in the form of an RF node neighbor list 2044 that is a list of RF identifiers 510A-L of neighbors of the respective RF node 1-12. RF node identifier database 1940 also includes a non-neighbor RF node list 2046. In the examples of FIGS. 20-23, the RF node identifier database 1940 is updated in response to receiving a repeater designation message 2043x to indicate from which source RF node that particular RF node is a repeater of. Each RF node identifier 510A-L is a unique numeric (or alphanumeric) identifier of the RF node 1-12. RF node identifier 510A-L is unique per flooding wireless network 25.

The memory 2035 further comprises neighbor relationship status messages (e.g., repeater status and connection number request messages 2041A-L), reply messages (e.g., repeater status and connection number response messages 2042A-L), and repeater designation messages 2043x.

Decentralized repeater designation programming 2090 of FIGS. 20, 21A-B, 22, and 23 and the matrix repeater designation programming 1990 of FIG. 19 is firmware/software that engages in communications with the lighting system 20 elements, including RF nodes 1-12 to designate repeaters over the flooding wireless network 25. Lighting control programming 2039 operates the driver circuit 2041 to control light source 2015, operates drive/sense circuitry 2055 to control detectors 260, and engages in network communications within the lighting control system 20.

Execution of the decentralized repeater designation programming 2090 by the server processor 230 configures the RF nodes 1-12 (e.g., luminaire 2000) to implement the decentralized repeater designation protocol 1400 described generally in FIG. 3 and more specifically in FIGS. 14-18, including designating some but not all of the RF nodes as repeaters by the following functions. First, transmitting, from each respective RF node 1-12 to other RF nodes, a neighbor relationship status message 2041A-L. Second, in response to receiving a reply message 2042A-L to the neighbor relationship status message at each respective RF node 1-12 from a respective first subset of other RF nodes within a predetermined timeout period: (i) establishing that each of the respective first subset of other RF nodes are within range to directly transmit and receive network packets to and from the respective RF node 1-12 over the flooding wireless network 25, and (ii) storing a respective RF node identifier of each of the respective first subset of other RF nodes in a respective RF node neighbor list 2044 to establish neighbor relationship status. Third, in response to failing to receive the reply message 2042A-L to the neighbor relationship status message 2041A-L from a respective second subset of the other RF nodes within the predetermined timeout period: (i) establishing that the respective second subset of other RF nodes are not within range to directly transmit and receive network packets to and from the respective RF node 1-12 over the flooding wireless network 25, and (ii) storing a respective RF node identifier of each of the respective second subset of other RF nodes in a respective non-neighbor RF node list 2046 to establish non-neighbor relationship status. Fourth, based on the respective RF node neighbor list 2044, for each respective RF node 1-12, determining a respective number of neighbors 605A-L. Fifth, in response to determining that the respective number of neighbors 605A-L is set to one or two for the respective RF node 1-12, transmitting a repeater designation message 2043x to each respective RF node identifier in the respective RF node neighbor list 2044 to designate the respective first subset of other RF nodes as repeaters. Sixth, assigning at least two designated repeaters of network packets over the flooding wireless network 25 for each respective RF node 1-12 having two or more neighbor RF nodes.

Assigning at least two designated repeaters of network packets over the flooding wireless network 25 for each respective RF node 1-12 having two or more neighbor RF nodes includes determining whether the respective number of neighbors 605A-L is three or more for the respective RF node 1-12. In response to determining that the respective number of neighbors 605A-L is three or more for the respective RF node 1-12, transmitting from each respective RF node 1-12 to each of the respective first subset of other RF nodes having the respective RF identifier 510A-L stored in the respective RF node neighbor list 2044, a respective repeater status and connection number request message 2041A-L.

Figure 21A:
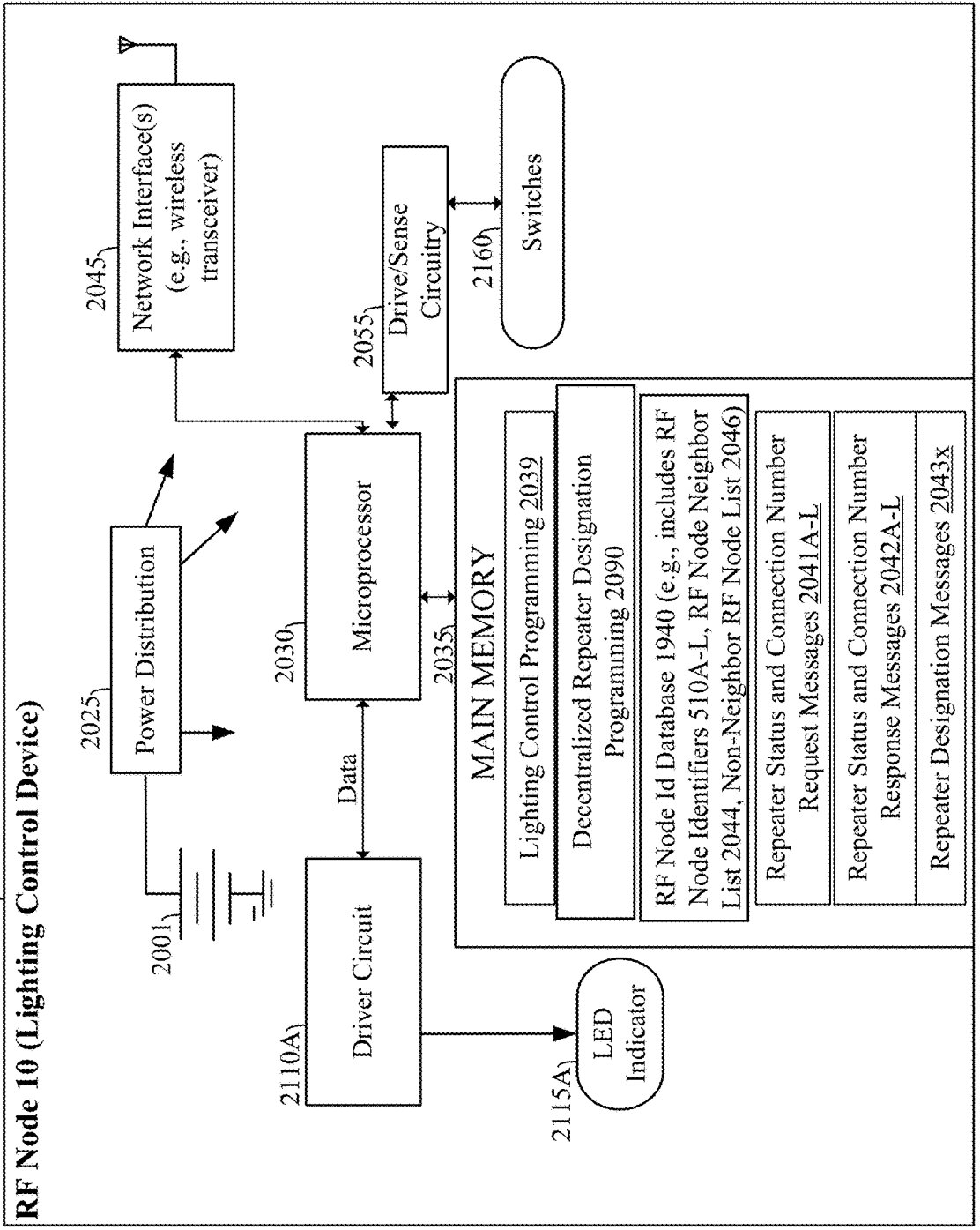
FIGS. 21A-B are block diagrams of two types of lighting control devices that communicate via the flooding wireless network of FIG. 1, specifically a wall switch and touch-screen device.
Figure 21B:
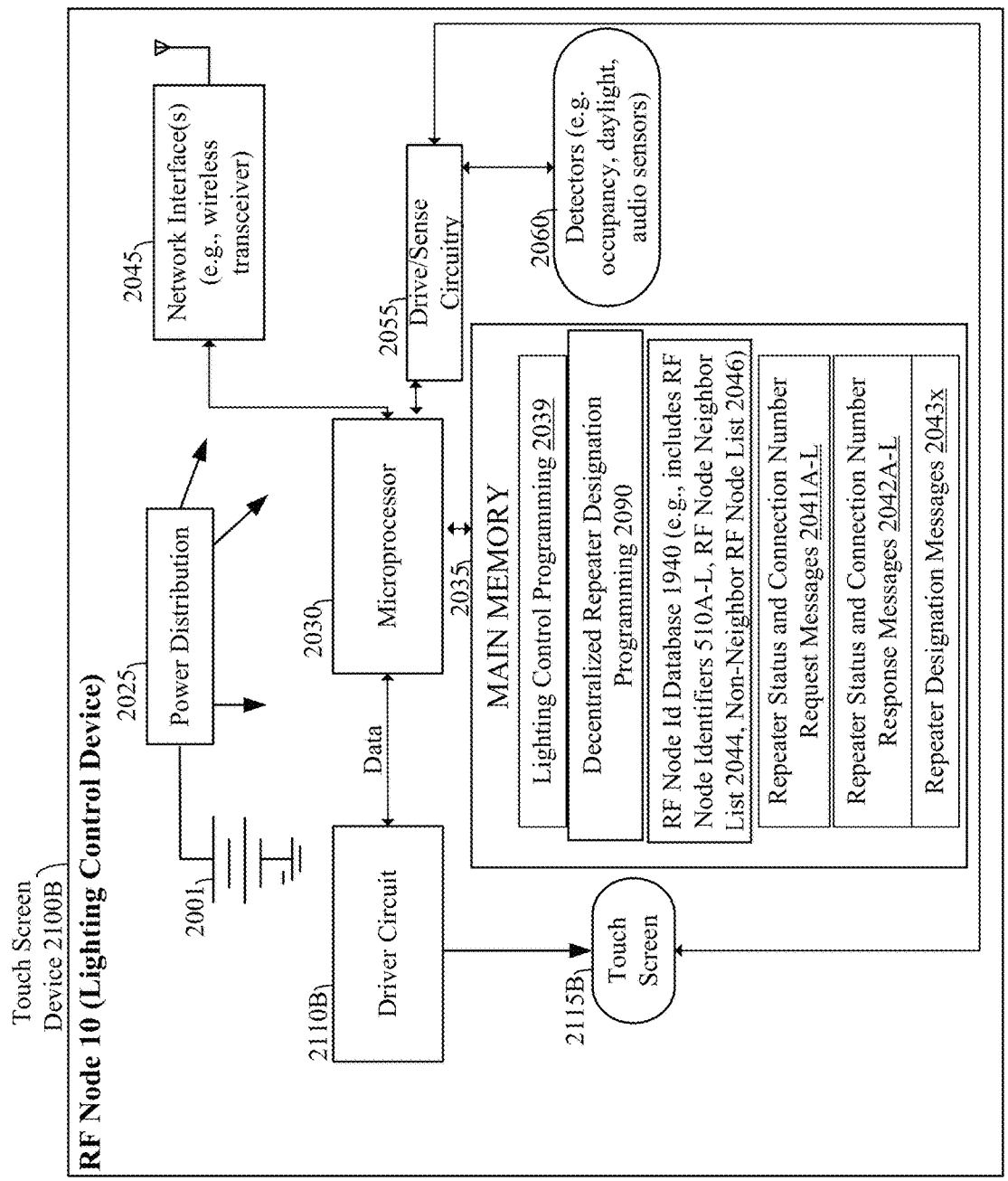

FIGS. 21A-B are block diagrams of two types of lighting control devices 10 that communicate via the flooding wireless network 25 of FIG. 1, specifically a wall switch 2100A and touchscreen device 2100B. The circuitry, hardware, and software of the lighting control devices 2100A, 2100B shown are similar to the luminaire 2000, including the memory 2035, to implement the repeater designation protocols 300, 400, 1400 described herein. Hence, main memory 2035 is shown as including the lighting control programming 2039, decentralized repeater designation programming 2090, RF node identifier (Id) database 1940 (including RF node identifiers 510A-L and RF node), repeater status and connection request messages 2041A-L, repeater status and connection response messages 2042A-L, and repeater designation messages 2043x. However, as shown, wall switch 2100A and touchscreen device 2100B can include a subset of the circuitry, hardware, and software shown for the luminaire 2000 of FIG. 20.

As shown in FIG. 21A, the RF node 10 is a wall switch 2100A where the drive/sense circuitry 2055 responds to switches 2160. Switches 2160 can be an on/off switch, dimmer switch, or set scene switch based on Acuity Brands Lighting's commercially available xPoint® Wireless ES7 product. In our some examples, wall switch 2100A includes a single shared button switch 2160 for on/off, dimming, or set scene functions and the LED indicator 2115A of wall switch 2100A. A button station can include various button settings that can have the lighting control settings adjusted, for example, four buttons can be arranged with two longitudinal buttons (north-south) and two lateral buttons (east-west).

In FIG. 21B, the RF node 10 is a touchscreen device 2100B where lighting control setting adjustments are inputted via a user interface application (not shown) through manipulation or gestures on a touch screen 2115B. For output purposes, the touch screen 2115B includes a display screen, such as a liquid crystal display (LCD) or light emitting diode (LED) screen or the like. For input purposes, touch screen 2115B includes a plurality of touch sensors.

A keypad may be implemented in hardware as a physical keyboard of touch screen device 2100B, and keys may correspond to hardware keys of such a keyboard. Alternatively, some or all of the keys (and keyboard) of touchscreen device 2100B may be implemented as "soft keys" of a virtual keyboard graphically represented in an appropriate arrangement via touch screen 2115B. The soft keys presented on the touch screen 2115B may allow the user of touchscreen device 2100B to invoke the same user interface functions as with the physical hardware keys.

Drive/sense circuitry 2055 is coupled to touch sensors of touch screen 2115B for detecting the occurrence and relative location/position of each touch with respect to a content display area of touch screen 2115B. In this example, drive/sense circuitry 2055 is configured to provide processor 2030 with touch-position information based on user input received via touch sensors. In some implementations, processor 2030 is configured to correlate the touch position information to specific content being displayed within the content display area on touch screen 2115B. The touch-position information captured by the drive/sense circuitry 2055 and provided to processor 2030 may include, but is not limited to, coordinates identifying the location of each detected touch with respect to the display area of touch screen 2115B and a timestamp corresponding to each detected touch position.

In general, touch screen 2115B and its touch sensors (and one or more keys, if included) are used to provide a textual and graphical user interface for the touchscreen device 2100B. In an example, touch screen 2115B provides viewable content to the user at lighting control device 10. Touch screen 2115B also enables the user to interact directly with the viewable content provided in the content display area, typically by touching the surface of the screen with a finger or an implement such as a stylus.

Figure 22:
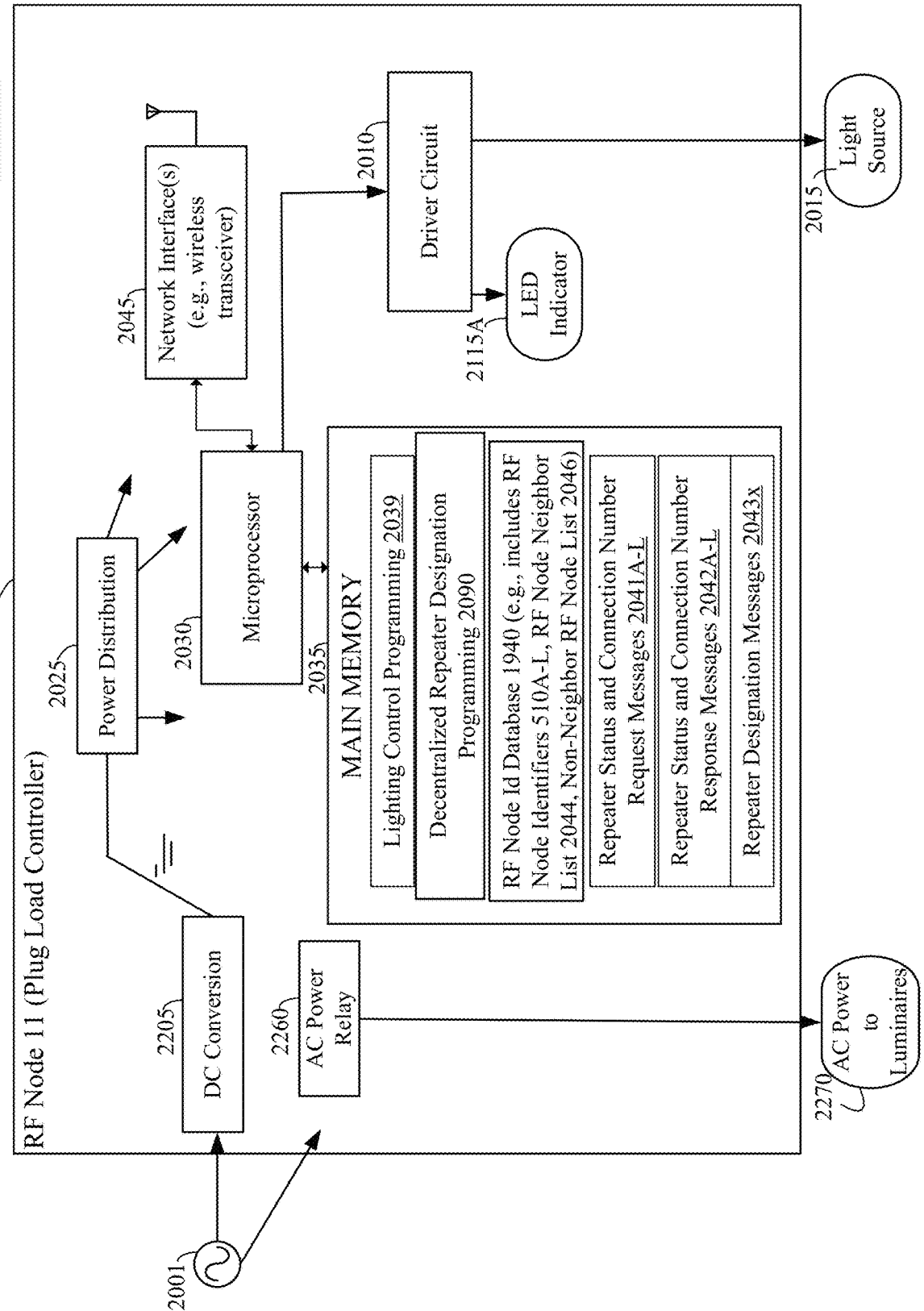
FIG. 22 is a block diagram of a plug load controller type of RF node that communicates via the flooding wireless network of FIG. 1.

FIG. 22 is a block diagram of a plug load controller 2200 type of RF node 11 that communicates via the flooding wireless network 25 of FIG. 1. The circuitry, hardware, and software of plug load controller 2200 shown is similar to the luminaire 2000 of FIG. 20. Hence, main memory 2035 is shown as including the lighting control programming 2039, decentralized repeater designation programming 2090, RF node identifier (Id) database 1940, repeater status and connection request messages 2041A-L, repeater status and connection response messages 2042A-L, and repeater designation messages 2043x.

However, plug load controller 2200 is a retrofit device that plugs into existing AC wall outlets, for example, and allows existing wired lighting devices, such as table lamps or floor lamps that plug into a wall outlet, to operate in the lighting control system. The plug load controller 2200 instantiates the table lamp or floor lamp by allowing for commissioning and maintenance operations and processes wireless lighting controls in order to the allow the lighting device to operate in the lighting system 20. As shown, plug load controller 2200 includes a DC conversion circuit 2205 (which may instead be a power supply) driven by a power source 2001, in our example, an AC line or mains. Power source 2001, however, may be a battery, solar panel, or any other AC or DC source.

DC conversion circuit 2205 receives power from the power source 2001, and may include a magnetic transformer, electronic transformer, switching converter, rectifier, or any other similar type of circuit to convert an input power signal into a suitable power signal to power itself. Plug load controller 2200 further comprises an AC power relay 2260, which relays incoming AC power from power source 2001 to other devices that may plug into the receptacle of plug load controller 2200 thus providing an AC power outlet 2270.

Plug load controller 2200 further includes a driver circuit 2010 to drive the external light source 2015 of the table or floor lamp, for example. The LED indicator 2115A indicates the state of the plug load controller 2200, for example, during commissioning and maintenance procedures.

Figure 23:
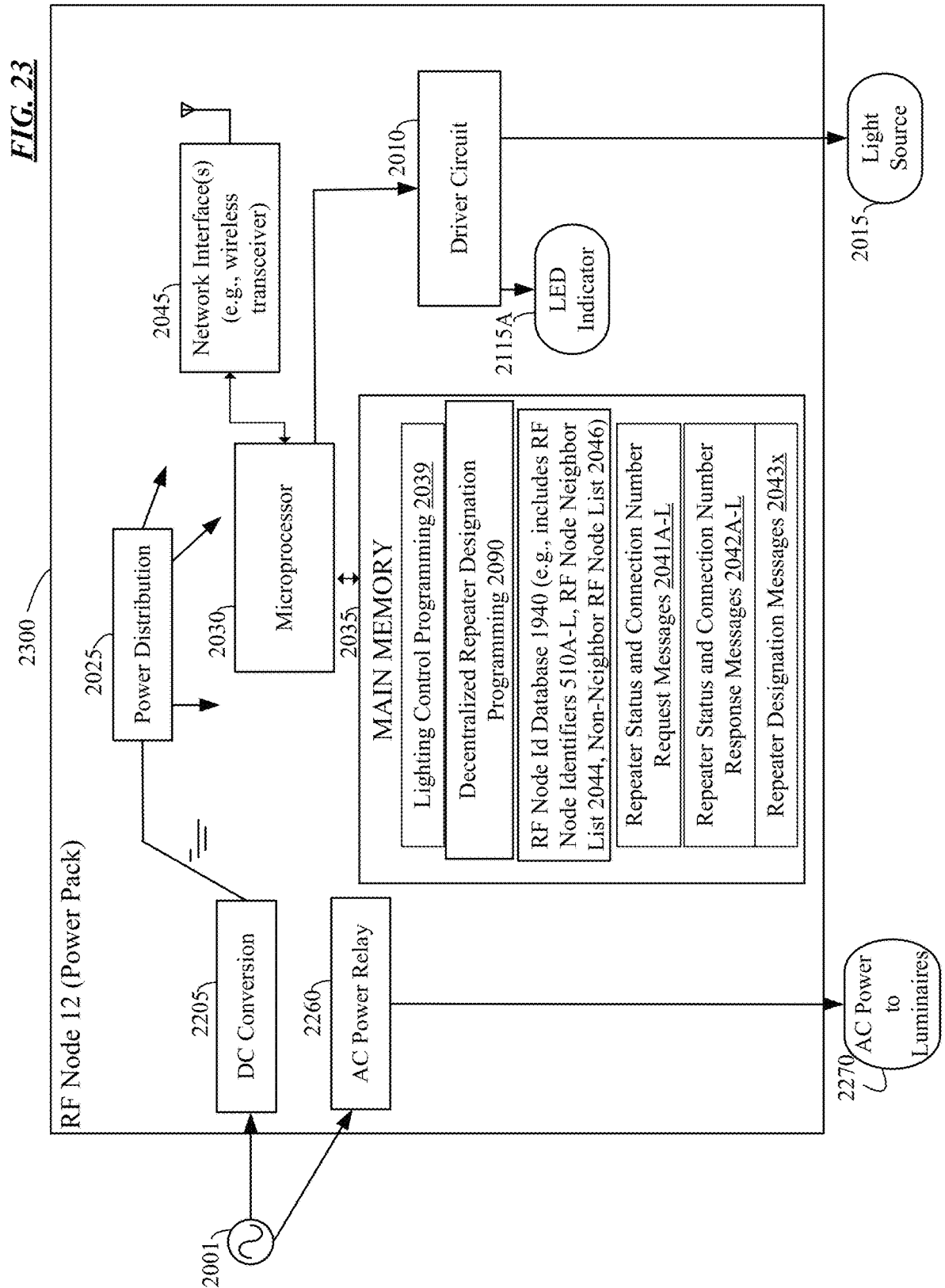
FIG. 23 is a block diagram of a power pack that communicates via the flooding wireless network of FIG. 1.

FIG. 23 is a block diagram of a power pack 2300 that communicates via the flooding wireless network 25 of FIG. 1. The circuitry, hardware, and software of plug load controller 30 shown is similar to the luminaire 2000 of FIG. 20 and plug load controller 2200 of FIG. 22. Hence, main memory 2035 is shown as including the lighting control programming 2039, decentralized repeater designation programming 2090, RF node identifier (Id) database 1940, repeater status and connection request messages 2041A-L, repeater status and connection response messages 2042A-L, and repeater designation messages 2043x. However, power pack 2300 is a device that retrofits with existing wired light fixtures (luminaires). The power pack 2300 instantiates the wired light fixture by allowing for commissioning and maintenance operations and processes wireless lighting controls in order to allow the lighting device to operate in the lighting system 20.

Any of the steps or functionality of the repeater designation protocols 300, 400, and 1400 described herein for the RF nodes (e.g., luminaires 1-8, gateway 9, lighting control device 10, plug load controller 11, and power pack 12) of the lighting system 20 can be embodied in programming or one more applications as described previously. This includes, for example, matrix repeater designation programming 1990 and decentralized repeater designation programming 2090. According to some embodiments, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A method, comprising steps of:
based on neighbor relationships among radio frequency (RF) nodes of a flooding wireless network, designating some but not all of the RF nodes as repeaters to select RF nodes as repeaters such that each RF node of the flooding wireless network has at least two neighboring RF nodes designated as repeaters, wherein designating some but not all of the RF nodes as repeaters includes:
  (a) building an RF node neighbor relationship matrix that includes a respective neighbor relationship status of each respective RF node to other RF nodes, wherein:
    i. for each respective RF node, the respective neighbor relationship status is set to indicate each of one or more neighboring RF nodes is within range to directly transmit and receive network packets to and from the respective RF node over the flooding wireless network, and
    ii. for each respective RF node, the respective neighbor relationship status is unset to indicate each of one or more non-neighboring RF nodes is not within range to directly transmit and receive network packets to and from the respective RF node over the flooding wireless network;
  (b) based on the built RF node neighbor relationship matrix, determining a respective number of neighbors for each respective RF node;
  (c) generating an RF node repeater matrix by:
    i. for each RF node determined to have two neighbors, designating each neighbor of the determined RF node as repeater;
    ii. assigning at least two designated repeaters of network packets over the flooding wireless network for each respective RF node having two or more RF node neighbors by:
      selecting one or more neighbors of any RF nodes not yet having at least two neighbors and designating each selected RF node as a repeater, such that each RF node has at least two neighbors designated as repeaters;
  (d) based on the RF node repeater matrix, configuring the designated RF nodes to act as repeaters;
configuring designated RF nodes to act as repeaters to receive and resend network packet transmissions from other RF nodes through the flooding wireless network; and
configuring all RF nodes not designated as repeaters not to resend network packet transmissions from other RF nodes through the flooding wireless network.

2. The method of claim 1, wherein selecting one or more neighbors of any RF nodes not yet having at least two neighbors and designating each selected RF node as the repeater includes:
  i. for each of undesignated RF nodes that are potential repeaters, calculating a respective potential repeater score, ii. designating one or more of the undesignated RF nodes with a highest respective potential repeater score as a repeater, and iii. repeating steps (a) and (b) until each of the RF nodes having two or more RF node neighbors is assigned at least two designated repeaters.

3. The method of claim 2, wherein calculating the respective potential repeater score includes:

adjusting the respective potential repeater score of the undesignated RF nodes to be more favorable to being designated repeater based on the respective number of neighbors being low; and adjusting the respective potential repeater score of the undesignated RF nodes to be less favorable to being designated repeater based on the respective number of neighbors being high.

4. The method of claim 2, wherein determining the respective number of neighbors for each respective RF node includes counting each respective neighbor relationship status set to indicate that the one or more neighboring RF nodes is within range to directly transmit and receive network packets to and from the respective RF node over the flooding wireless network.

5. The method of claim 4, wherein calculating the respective potential repeater score includes:

determining a respective number of connections by subtracting from the respective number of neighbors each of the RF nodes already assigned at least two designated repeaters or designated as repeaters.

6. The method of claim 5, wherein calculating the respective potential repeater score further includes:

dividing a constant value by the respective number of connections to calculate the respective potential repeater score.

7. The method of claim 5, wherein calculating the respective potential repeater score further includes:

determining a maximum number of connections by summing up each of the respective number of connections.

8. The method of claim 7, wherein calculating the respective potential repeater score further includes:

dividing the respective number of connections by the maximum number of connections to calculate the respective potential repeater score.

9. A method, comprising steps of:

based on neighbor relationships among radio frequency (RF) nodes of a flooding wireless network, designating some but not all of the RF nodes as repeaters to select RF nodes as repeaters such that each RF node of the flooding wireless network has at least two neighboring RF nodes designated as repeaters, wherein designating some but not all of the RF nodes as repeaters includes:

(a) transmitting, from each respective RF node to other RF nodes, a neighbor relationship status message;

(b) in response to receiving a reply message to the neighbor relationship status message at each respective RF node from a respective first subset of other RF nodes within a predetermined timeout period:

i. establishing that each of the respective first subset of other RF nodes are within range to directly transmit and receive network packets to and from the respective RF node over the flooding wireless network, and ii. storing a respective RF node identifier of each of the respective first subset of other RF nodes in a respective RF node neighbor list to establish neighbor relationship status;

(c) in response to failing to receive the reply message to the neighbor relationship status message from a respective second subset of the other RF nodes within the predetermined timeout period:

i. establishing that the respective second subset of other RF nodes are not within range to directly transmit and receive network packets to and from the respective RF node over the flooding wireless network, and ii. storing a respective RF node identifier of each of the respective second subset of other RF nodes in a respective non-neighbor RF node list to establish non-neighbor relationship status;

(d) based on the respective RF node neighbor list, for each respective RF node, determining a respective number of neighbors;

(e) in response to determining that the respective number of neighbors is set to one or two for the respective RF node, transmitting a repeater designation message to each respective RF node identifier in the respective RF node neighbor list to designate the respective first subset of other RF nodes as repeaters; and (f) assigning at least two designated repeaters of network packets over the flooding wireless network for each respective RF node having two or more neighbor RF nodes;

configuring designated RF nodes to act as repeaters to receive and resend network packet transmissions from other RF nodes through the flooding wireless network; and configuring all RF nodes not designated as repeaters not to resend network packet transmissions from other RF nodes through the flooding wireless network.

10. The method of claim 9, wherein assigning at least two designated repeaters of network packets over the flooding wireless network for each respective RF node having two or more neighbor RF nodes includes:

in response to determining that the respective number of neighbors is three or more for the respective RF node, transmitting from each respective RF node to each of the respective first subset of other RF nodes having the respective RF node identifier stored in the respective RF node neighbor list, a respective repeater status and connection number request message.

11. The method of claim 10, wherein the neighbor relationship status message is a respective repeater status and connection number request message that requests a repeater status and connection number response message as the reply message indicating whether a respective one of the respective first subset of other RF nodes is of a designated repeater status and a respective number of connections.

12. The method of claim 11, wherein assigning at least two designated repeaters of network packets over the flooding wireless network for each respective RF node having two or more neighbor RF nodes further includes:

assigning the respective one of the respective first subset of other RF nodes when the repeater status and connection response message indicates the designated repeater status.

13. The method of claim 12, wherein assigning at least two designated repeaters of network packets over the flooding wireless network for each respective RF node having two or more neighbor RF nodes further includes:

calculating a respective potential repeater score for the respective one of the first subset of other RF nodes by:

adjusting the respective potential repeater score to be more favorable to being designated repeater based on the respective number of connection being low, and adjusting the respective potential repeater score to be less favorable to being designated repeater based on the respective number of connections being high.

14. A network controller comprising:

a wireless transceiver configured for data communication over a flooding wireless network that includes a plurality of radio frequency (RF) nodes;

a processor coupled to the wireless transceiver;

a memory accessible to the processor, wherein the memory stores: (i) an RF node neighbor relationship matrix, and (ii) an RF node neighbor repeater matrix; and repeater designation programming in the memory, wherein execution of the repeater designation programming by the processor configures the network controller to implement functions, including functions to:

based on neighbor relationships among the RF nodes of the flooding wireless network, designate some but not all of the RF nodes as repeaters to select RF nodes as repeaters such that each RF node of the flooding wireless network has at least two neighboring RF nodes designated as repeaters, wherein designating some but not all of the RF nodes as repeaters includes:

(a) building the RF node neighbor relationship matrix that includes a respective neighbor relationship status of each respective RF node to other RF nodes, wherein:

i. the respective neighbor relationship status is set to indicate each of one or more neighboring RF nodes is within range to directly transmit and receive network packets to and from the respective RF node over the flooding wireless network, and ii. for each respective RF node, the respective neighbor relationship status is unset to indicate each of one or more non-neighboring RF nodes is not within range to directly transmit and receive network packets to and from the respective RF node over the flooding wireless network;

(b) based on the built RF node neighbor relationship matrix, determining a respective number of neighbors for each respective RF node;

(c) generating an RF node repeater matrix by:

i. for each RF node determined to have two neighbors, designating each neighbor of the determined RF node as repeater;

ii. assigning at least two designated repeaters of network packets over the flooding wireless network for each respective RF node having two or more RF node neighbors by:

selecting one or more neighbors of any RF nodes not yet having at least two neighbors and designating each selected RF node as a repeater, such that each RF node has at least two neighbors designated as repeaters;

(d) based on the RF node repeater matrix, configuring the designated RF nodes to act as repeaters;

configure designated RF nodes to act as repeaters to receive and resend network packet transmissions from other RF nodes through the flooding wireless network; and configure all RF nodes not designated as repeaters not to resend network packet transmissions from other RF nodes through the flooding wireless network.

15. The network controller of claim 14, wherein selecting one or more neighbors of any RF nodes not yet having at least two neighbors and designating each selected RF node as the repeater includes:

a) for each of undesignated RF nodes that are potential repeaters, calculating a respective potential repeater score, b) designating one or more of the undesignated RF nodes with a highest respective potential repeater score as a repeater, and c) repeating steps (a) and (b) until each of the RF nodes having two or more RF node neighbors is assigned at least two designated repeaters.

16. The network controller of claim 15, wherein calculating the respective potential repeater score includes:

adjusting the respective potential repeater score of the undesignated RF nodes to be more favorable to being designated repeater based on the respective number of neighbors being low; and adjusting the respective potential repeater score of the undesignated RF nodes to be less favorable to being designated repeater based on the respective number of neighbors being high.

17. A network controller comprising:

a wireless transceiver configured for data communication over a flooding wireless network that includes a plurality of radio frequency (RF) nodes;

a processor coupled to the wireless transceiver;

a memory accessible to the processor;

repeater designation programming in the memory, wherein execution of the repeater designation programming by the processor configures the network controller to implement functions, including functions to:

based on neighbor relationships among the RF nodes of the flooding wireless network, designate some but not all of the RF nodes as repeaters to select RF nodes as repeaters such that each RF node of the flooding wireless network has at least two neighboring RF nodes designated as repeaters, wherein designating some but not all of the RF nodes as repeaters includes:

(a) transmitting, from each respective RF node to other RF nodes, a neighbor relationship status message;

(b) in response to receiving a reply message to the neighbor relationship status message at each respective RF node from a respective first subset of other RF nodes within a predetermined timeout period:

i. establishing that each of the respective first subset of other RF nodes are within range to directly transmit and receive network packets to and from the respective RF node over the flooding wireless network, and ii. storing a respective RF node identifier of each of the respective first subset of other RF nodes in a respective RF node neighbor list to establish neighbor relationship status;

(c) in response to failing to receive the reply message to the neighbor relationship status message from a respective second subset of the other RF nodes within the predetermined timeout period:

i. establishing that the respective second subset of other RF nodes are not within range to directly transmit and receive network packets to and from the respective RF node over the flooding wireless network, and ii. storing a respective RF node identifier of each of the respective second subset of other RF nodes in a respective non-neighbor RF node list to establish non-neighbor relationship status;

(d) based on the respective RF node neighbor list, for each respective RF node, determining a respective number of neighbors;

(e) in response to determining that the respective number of neighbors is set to one or two for the respective RF node, transmitting a repeater designation message to each respective RF node identifier in the respective RF node neighbor list to designate the respective first subset of other RF nodes as repeaters; and (f) assigning at least two designated repeaters of network packets over the flooding wireless network for each respective RF node having two or more neighbor RF nodes;

configure designated RF nodes to act as repeaters to receive and resend network packet transmissions from other RF nodes through the flooding wireless network; and configure all RF nodes not designated as repeaters not to resend network packet transmissions from other RF nodes through the flooding wireless network.

18. The network controller of claim 17, wherein assigning at least two designated repeaters of network packets over the flooding wireless network for each respective RF node having two or more neighbor RF nodes includes:

in response to determining that the respective number of neighbors is three or more for the respective RF node, transmitting from each respective RF node to each of the respective first subset of other RF nodes having the respective RF node identifier stored in the respective RF node neighbor list, a respective repeater status and connection number request message.

* * * * *